US012101734B2

(12) United States Patent
Luong et al.

(10) Patent No.: US 12,101,734 B2
(45) Date of Patent: Sep. 24, 2024

(54) ANTENNA SHARING FOR MULTIPLE WIRELESS COMMUNICATION TECHNOLOGIES

(71) Applicant: QUALCOMM Incorporated, San Diego, CA (US)

(72) Inventors: Le Nguyen Luong, San Diego, CA (US); Liang Zhao, Saratoga, CA (US); Cheng-Han Wang, San Jose, CA (US); Santosh Kumar Gupta, San Jose, CA (US); Shishir Gupta, San Jose, CA (US); Michael Kohlmann, San Francisco, CA (US); Xiaoxin Zhang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 17/699,918

(22) Filed: Mar. 21, 2022

(65) Prior Publication Data
US 2023/0300775 A1    Sep. 21, 2023

(51) Int. Cl.
*G08B 25/00*    (2006.01)
*H04W 64/00*   (2009.01)

(52) U.S. Cl.
CPC .................................. *H04W 64/00* (2013.01)

(58) Field of Classification Search
CPC ......... H04W 64/00; H04W 88/06; H04B 7/04
See application file for complete search history.

(56) References Cited

U.S. PATENT DOCUMENTS

| | | | |
|---|---|---|---|
| 10,677,884 B2 | 6/2020 | Jiang et al. | |
| 11,510,172 B1* | 11/2022 | Feng | G01S 5/14 |
| 11,924,802 B2* | 3/2024 | Raghavan | H04W 64/003 |
| 2015/0215793 A1 | 7/2015 | Siomina et al. | |
| 2021/0136600 A1* | 5/2021 | Le | H04B 17/318 |
| 2022/0039056 A1 | 2/2022 | Manolakos et al. | |
| 2022/0322277 A1* | 10/2022 | Duan | H04B 17/27 |

OTHER PUBLICATIONS

International Search Report and Written Opinion—PCT/US2023/011777—ISA/EPO—May 22, 2023.

* cited by examiner

*Primary Examiner* — Toan N Pham
(74) *Attorney, Agent, or Firm* — QUALCOMM Incorporated

(57) ABSTRACT

Differing operations of a wireless communication device benefit from different antenna configurations, such as for positioning, where closely spaced antennas are desirable, and data communication, where antenna diversity is desirable. A device is configured to receive a request for receive a request for determining a position of a user equipment (UE), select one of a first plurality of antennas or a second plurality of antennas for determining the position of the UE, receive wireless signals using the selected first plurality of antennas or the second plurality of antennas, and determine the position of the UE based at least in part on the received wireless signals.

47 Claims, 9 Drawing Sheets

ANTENNA SHARING FOR MULTIPLE WIRELESS COMMUNICATION TECHNOLOGIES

BACKGROUND

Field

Subject matter disclosed herein relates to wireless locationing of a user equipment and more particularly to wireless locationing of a user equipment configured to receive wireless signals in accordance with a plurality of wireless communication technologies.

Information

The location of a user equipment (UE), such as a cellular telephone, may be useful or essential to a number of applications including emergency calls, navigation, direction finding, asset tracking and Internet service. The location of a UE may be estimated based on information gathered from various systems. In a cellular network implemented according to 4G (also referred to as Fourth Generation) Long Term Evolution (LTE) radio access or 5G (also referred to as Fifth Generation) "New Radio" (NR), for example, a base station may transmit downlink reference signals or a UE may transmit uplink reference signals that are used for positioning. For example, to perform positioning, a UE may transmit a sounding reference signal (SRS) that is received by a base station. The base station may measure an angle of arrival (AoA) of the SRS to identify a direction of the UE from the base station, may measure a zenith of arrival (ZoA) of the SRS to identify an elevation of the UE with reference to the base station, and may measure a time of arrival (TOA) of the SRS to be used to identify a distance of the UE from the base station. Similarly, a base station may transmit a positioning reference signal (PRS) that is received by a UE, and the UE may measure an AoA, ZoA, and TOA of the PRS to identify a position of the UE with reference to the base station.

SUMMARY

The position of a user equipment (UE) may be determined based on signals transmitted and received via one of a first plurality of antennas or a second plurality of antennas. The antennas of the first plurality of antennas may be closely spaced, such as where neighboring antennas of the first plurality of antennas are located within half a wavelength of the received signals. In contrast, the antennas of the second plurality of antennas may be spaced further apart, for example, one or more pairs of neighboring antennas of the second plurality of antennas may be separated by more than half a wavelength of the received signals. This may allow for the first plurality of antennas to be configured for accurately determining an angle of arrival (AoA) of the received signals, while the second plurality of antennas may be configured to have sufficient diversity for ranging and data communication operations.

In one implementation, a method for supporting position locationing of a UE in a wireless network includes receiving a request for determining a position of the UE, selecting one of a first plurality of antennas or a second plurality of antennas coupled to the UE, receiving wireless signals using the selected first plurality of antennas or the second plurality of antennas, and determining the position of the UE based at least in part on the received wireless signals.

In some aspects, each antenna of the first plurality of antennas is located within a threshold distance of each other antenna of the first plurality of antennas, and each antenna of the second plurality of antennas is located more than the threshold distance from each other antenna of the second plurality of antennas. In some aspects, the threshold distance corresponds to half a wavelength of the received wireless signals. In some aspects, the first plurality of antennas is selected, and determining the position of the UE in block 808 includes determining the position of the UE based at least in part on an angle of arrival (AoA) of the received wireless signals.

In some aspects, selecting one of the first plurality of antennas or the second plurality of antennas is based on a wireless communication technology selected for determining the position of the UE. In some aspects, the wireless communication technology is selected from two or more wireless communication technologies. In some aspects, selecting one of the first plurality of antennas or the second plurality of antennas includes coupling the selected first plurality of antennas or second plurality of antennas to a wireless receiver associated with the selected wireless communication technology. In some aspects, the two or more wireless communication technologies include one or more of an ultrawideband (UWB) wireless communication technology, a Wi-Fi wireless communication technology, and a 5G new radio (NR) wireless communication technology. In some aspects, selecting the wireless communication technology is based at least in part on a positioning accuracy associated with each of the two or more wireless communication technologies. In some aspects, selecting the wireless communication technology is based at least in part on a power consumption associated with each of the two or more wireless communication technologies. In some aspects, selecting the wireless communication technology is based at least in part on a maximum range associated with each of the two or more wireless communication technologies.

In some aspects, the received request includes a requested wireless communication technology for determining the position of the UE, and the method further includes coupling the selected first plurality of antennas or second plurality of antennas to a receiver associated with the requested wireless communication technology.

In some aspects, the method further includes identifying a wireless communication technology associated with the received request, determining that two or more wireless communication technologies have concurrently requested use of the selected first plurality of antennas or second plurality of antennas, selecting one wireless communication technology for use of the selected first plurality of antennas or second plurality of antennas, and coupling the selected first plurality of antennas or second plurality of antennas to a receiver associated with the selected wireless communication technology. In some aspects, the wireless communication technology is selected based at least in part on respective priorities associated with each wireless communication technology of the two or more wireless communication technology. In some aspects, the wireless communication technology is selected based at least in part on respective duty cycles associated with each wireless communication technology of the two or more wireless communication technology.

In one implementation, a device configured for supporting position locationing of a user equipment (UE) in a wireless network, includes an antenna system including at least a first plurality of antennas and a second plurality of antennas, at least one transceiver coupled to the antenna system, at one memory, and at least one processor coupled to the at least one transceiver and the at least one memory. The at least one processor is configured to cause the device to receive a request for determining a position of the UE, select one of the first plurality of antennas or the second plurality of antennas for determining the position of the UE, receive wireless signals using the selected first plurality of antennas or the second plurality of antennas, and determine the position of the UE based at least in part on the received wireless signals.

In one implementation, a non-transitory computer readable storage medium stores instructions for execution by one or more processors of a device configured for supporting position locationing of a user equipment (UE) in a wireless network. Execution of the instructions causes the UE to perform operations including receiving a request for determining a position of the UE, selecting one of a first plurality of antennas or a second plurality of antennas coupled to the UE, receiving wireless signals using the selected first plurality of antennas or the second plurality of antennas, and determining the position of the UE based at least in part on the received wireless signals.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
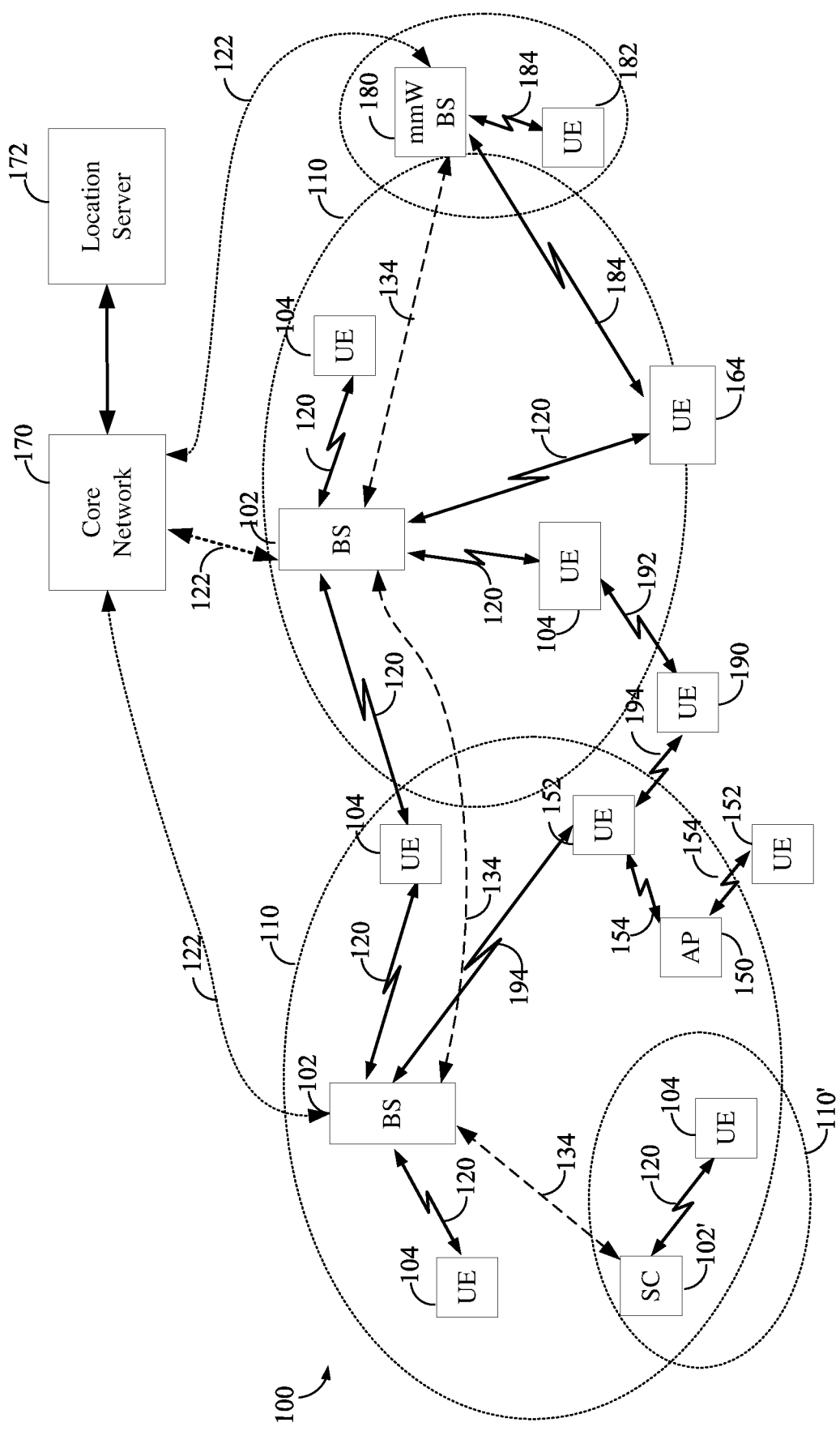
FIG. 1 illustrates an exemplary wireless communications system.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" (BS) are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the IEEE 802.11 set of standards, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNodeB or gNB), etc. In addition, in some systems a base station may provide purely edge node signaling functions while in other systems it may provide additional control and/or network management functions. A communication link through which UEs can send signals to a base station is called an uplink (UL) or reverse link channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). A communication link through which UEs can send signals to or from each other is called a sidelink (SL). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). In some implementations, a TRP may be a UE.

To support positioning of a UE, two broad classes of positioning solutions have been defined: control plane based and user plane based. With reference to control plane (CP) positioning, signaling related to positioning and support of positioning may be carried over existing network (and UE) interfaces and using existing protocols dedicated to the transfer of signaling. With reference to user plane (UP) positioning, signaling related to positioning and support of positioning may be carried as part of other data using such protocols as the Internet Protocol (IP), Transmission Control Protocol (TCP) and User Datagram Protocol (UDP). As used herein, "positioning" may also be referred to as "location-ing," "position locationing," "wireless locationing," "UE locationing," or the like.

The Third Generation Partnership Project (3GPP) has defined control plane positioning solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). For UP positioning, release 16 of the 3GPP standard for NR defines multi-cell round trip time (RTT), DL angle of departure (AoD), and UL angle of arrival (AoA) with zenith and azimuth. In some aspects, AoA may also be referred to as a direction of arrival (DoA). Release 16 also defines UE-based positioning associated with DL-TDOA and DL-AOD, DL-positioning reference signal (PRS) (DL-PRS) and sounding reference signal (SRS) for positioning. Release 16 also defines beam-specific (PRS) operation for mmWave and broadcasting of assistance data for positioning. Release 17 of the 3GPP standard for NR may define UE-initiated on-demand transmission of a DL-PRS, network-initiated on-demand transmission of a DL-PRS, Radio Resource Control (RRC) inactive DL-only, UL-only, or DL+UL based positioning, access point (AP) DL-PRS transmission, and/or aggregation of DL-PRS across multiple frequencies. Release 17 of the 3GPP standard for NR may also device transmission of sounding reference signals (SRS) from a UE on an uplink to a base station. The Open Mobile Alliance (OMA) has similarly defined a UP positioning solution known as Secure User Plane Location (SUPL), which can be used to locate a UE accessing any of a number of radio interfaces that support IP packet access such as General Packet Radio Service (GPRS) with GSM, GPRS with UMTS, or IP access with LTE or NR.

Both CP and UP based positioning (also referred to as location or locationing) solutions may employ a location server to support positioning of a UE. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements for the UE to determine an estimated location of the UE. During a location session, a location server may request positioning capabilities of a UE or base station (or the UE or base station may provide them without a request) and may request a location estimate or location measurements for a UE for various positioning techniques, e.g., for the Global Navigation Satellite System (GNSS), Time Difference of Arrival (TDOA), Angle of Departure (AoD), Round Trip Time (RTT) or multi cell RTT (Multi-RTT), and/or Enhanced Cell ID (ECID) position methods.

A type of positioning technique (which may be defined in the 3GPP set of standards) is an angle of arrival (AoA) technique, which includes measuring the AoA (and possibly a zenith of arrival (ZoA) if not included in the AoA) of a reference signal received at the device. An AoA technique may be performed at a base station for measuring a received sounding reference signal (SRS) that is transmitted by a UE or may be performed at the UE for measuring a received positioning reference signal (PRS) that is transmitted by the base station. The AoA indicates the direction of the UE from the base station, and a ZoA indicates the elevation of the UE with reference to the base station. To note, the AoA may include the ZoA such that the AoA is in a three dimensional space. The UE or base station may also measure a TOA, which may be used to determine the distance of the UE from the base station.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a positioning session, a location server, base station, and/or UE may exchange messages defined according to a positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages may be exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B or gNodeB (gNB) for the UE. LPP and LPP/LPPe may also be used to help support the OMA SUPL solution for many types of wireless access that support IP messaging (such as LTE, NR and Wi-Fi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message.

A location server and a base station (e.g., an eNodeB for LTE access or a gNB for NR access) may exchange LPP or NR positioning protocol (NRPP) messages to enable the base station to perform one or more measurements for locationing or to configure the location server and base station to obtain by the location server position measurements for a particular UE from the base station. In the case of LTE access, the LPP A (LPPa) protocol may be used to transfer such messages between a base station that is an eNodeB (eNB) and a location server that is an E-SMLC. In the case of NR access, the NRPP A protocol may be used to transfer such messages between a base station that is a gNodeB (gNB) and a location server that is an LMF. It is noted that the terms "parameter" and "information element" (IE) are synonymous and are used interchangeably herein.

During positioning using signaling in LTE and 5G NR, a UE may acquire dedicated positioning signals transmitted by base stations, e.g., a positioning reference signal (PRS), which are used to generate the desired measurements for the supported positioning technique, e.g., an AoA, ZoA and/or TOA. PRS is defined for 5G NR positioning to enable UEs to detect and measure neighbor base stations or Transmission and Reception Points (TRPs). Downlink (DL) PRS may be received by a UE from a reference base station and/or one or more neighboring stations and used to generate the desired measurements for the supported positioning technique, e.g., an AoA, ZoA, and/or TOA. Based on the TOA of the PRS from the reference and neighboring base stations, the UE may generate DL Reference Signal Time Difference (RSTD) for DL TDOA positioning, sometimes referred to as Observed Time Difference of Arrival (OTDOA). In a similar process, the UE may transmit uplink (UL) references signals for positioning, referred to as Sounding Reference Signals (SRS) for positioning to a reference base station and neighboring base stations. A base station may receive an SRS and generate the desired measurements for the supported positioning technique, e.g., an AoA, ZoA, and/or TOA. The TOAs of the SRS at the reference and neighboring stations may be used to generate an UL RSTD of UL TDOA positioning, sometimes referred to as UL Time Difference of Arrival (UTDOA). The UE locationing measurements may be provided to the location server to determine a location of the UE in the wireless network or to perform other operations of the wireless network (such as cell selection, navigation, or other operations).

A UE includes an antenna system including a plurality of antenna components. When determining an AoA of a transmitting device, such as a base station, based on wireless signals received from the transmitting device, it may be advantageous for the receiving antennas to be closely spaced. For example it may be advantageous for neighboring antennas to be spaced within half a wavelength of the signals received from the transmitting device. However, in other operating conditions, it may be more advantageous for the antennas to be spaced further apart. For example, for antenna diversity, which may be important for data communication and ranging applications, it may be advantageous for the antennas to be spaced much further apart than may be favorable for determining AoA. In conventional wireless transceivers, various wireless communication technologies and protocols may be associated with either closely spaced, or further spaced pluralities of antennas. For example, ultrawideband (UWB) technologies may be used for AoA determinations and may therefore be associated with closely spaced antennas. Because such antennas are too closely spaced for achieving sufficient diversity, such as achieving sufficient combination gain using techniques such as maximal ratio combining (MRC), such UWB transceivers may not be well configured for data communication and ranging applications. This may be problematic as UWB may also commonly be used for ranging applications. Other technologies, such as WLAN and 5G NR technologies, may typically be used mainly for data communications. Such WLAN and 5G NR transceivers may typically include antennas which are further spaced. Consequently, such conventional WLAN and 5G NR transceivers may not be well configured for determining AoA, even though WLAN and 5G NR may be used for determining AoA. It would therefore be desirable to improve the data communication capabilities of UWB transceivers, and to improve the AoA capabilities of WLAN and 5G NR transceivers.

In the specific examples described herein, a UE may include antennas configured for accurate determinations of AoA of received wireless signals, in addition to antennas configured to provide sufficient diversity for data communication. More particularly, the antennas may include a first plurality of antennas which are closely spaced for AoA determinations, in addition to a second plurality of antennas which are spaced farther apart to provide better combination gain and diversity. For example, neighboring antennas of the first plurality of antennas may be located within half a wavelength of the wireless signals to be used for AoA determination operations, while neighboring antennas of the second plurality of antennas may be spaced farther apart and may for example be spaced as far apart as practicable given the size of the UE. For example, at least one pair of antennas of the second plurality of antennas may be separated by more than half a wavelength. Each of these pluralities of antennas may then be selectably coupled to appropriate radio and modem circuitry in order to support AoA, ranging, and data communication applications.

An example UE may be configured to operate in accordance with multiple wireless communication technologies. Because such technologies may have similar wavelengths, the first plurality of antennas and the second plurality of antennas may each be used for transmitting and receiving wireless signals associated with each supported communication technology. For example, UWB, 6 GHz WLAN, and 5G NR have similar wavelengths, and thus transceiver circuits associated with UWB, 6 GHz WLAN, and 5G NR may each be configured to receive signals via each of the first plurality of antennas and the second plurality of antennas. More particularly, the first plurality of antennas, which are closely spaced, may be used for transmitting and receiving wireless signals to be used for AoA determinations, while the second plurality of antennas may be used for transmitting and receiving signals to be used for ranging or data communication. In some aspects, each plurality of antennas may be selectably coupled to each receiver circuit using external switching. In some other aspects, internal switching or feedforward paths may be used for selectably coupling each plurality of antennas to the appropriate transceiver circuitry. In some aspects, the external switching or internal switching or feedforward paths may be controlled by an antenna management unit, or AMU. As an alternative, rather than selectively coupling the first and second pluralities of antennas to appropriate transceiver circuitry, a splitter may be provided, coupling each of the first plurality of antennas and second plurality of antennas to two or more transceiver circuits. While such a configuration may be simpler than the use of external switching or feedforward paths, it may also be associated with degradation of signal power. For example, when the first plurality and second plurality of antennas are each coupled to two transceiver circuits via such a splitter, there may be a resulting loss of power in the signals received with such a configuration, such as a 3 dB loss in signal power.

Because transceiver circuits associated with multiple wireless communication technologies may be coupled to each of the first plurality of antennas and the second plurality of antennas, care must be taken to share access to the antennas. For example, differing wireless communication technologies may have differing priorities and duty cycles within the UE, and different wireless communication technologies may perform ranging with differing accuracies, power consumptions, and having different ranges. According to some implementations, selectably coupling the first plurality of antennas and the second plurality of antennas to the transceiver circuits of the UE may be based on these priorities, duty cycles, accuracies, effective ranges, and power consumptions.

FIG. 1 illustrates an exemplary wireless communications system 100. The wireless communications system 100 (which may also be referred to as a wireless wide area network (WWAN) or a wireless network (e.g., a cellular network)) may include various base stations 102 and various UEs 104, which one or more of the base stations 102 and/or UEs 104 may sometimes be referred to herein as TRPs 102 or 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to a location server 172, which may include one or more location servers. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station or UE (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), signal-to-noise ratio (SNR), etc.) of the RF signals received from that direction.

For receive beamforming being performed to receive a reference signal for UE locationing (e.g., an SRS transmitted by a UE or a PRS transmitted by a base station), the subarrays of the antenna array are each associated with an error in generating a UE locationing measurement (such as an AoA or a ZoA). In some aspects, a subset of subarrays may be determined to be used for UE locationing based on the errors. While the example is described with reference to a subset of subarrays, a subset of any suitable antenna components may be determined to be used for UE locationing (such as a subset of antennas from a plurality of antennas).

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the primary carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be a primary carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz) compared to that attained by a single 20 MHz carrier. Transmission of reference signals, AEG reports, requests for AEG reports, configuration information for setting a positioning session, or other communications that may occur between a base station and a UE may be performed using any suitable carrier.

The wireless communications system 100 may further include one or more UEs, such as UE 190, that connects indirectly to one or more communication networks via one or more sidelinks (SLs), such as device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, UWB, and so on. In the example, the UE 190 may be a relay UE between the UE 152 and a base station 102. One or multiple UEs may be relay UEs between a device and a base station. In some aspects, one or more UEs may be coupled to an AP and a BS. For example, the UE 152 is shown to be coupled to each of the AP 150 and the BS 102.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

A target UE 104 for positioning may be within wireless range of one or more base stations 102 (which may be TRPs 102 for positioning of the target UE 104). For UE locationing, a base station may transmit a PRS on a DL to one or more target UEs, or a target UE may transmit an SRS on an UL to one or more base stations.

Figure 2:
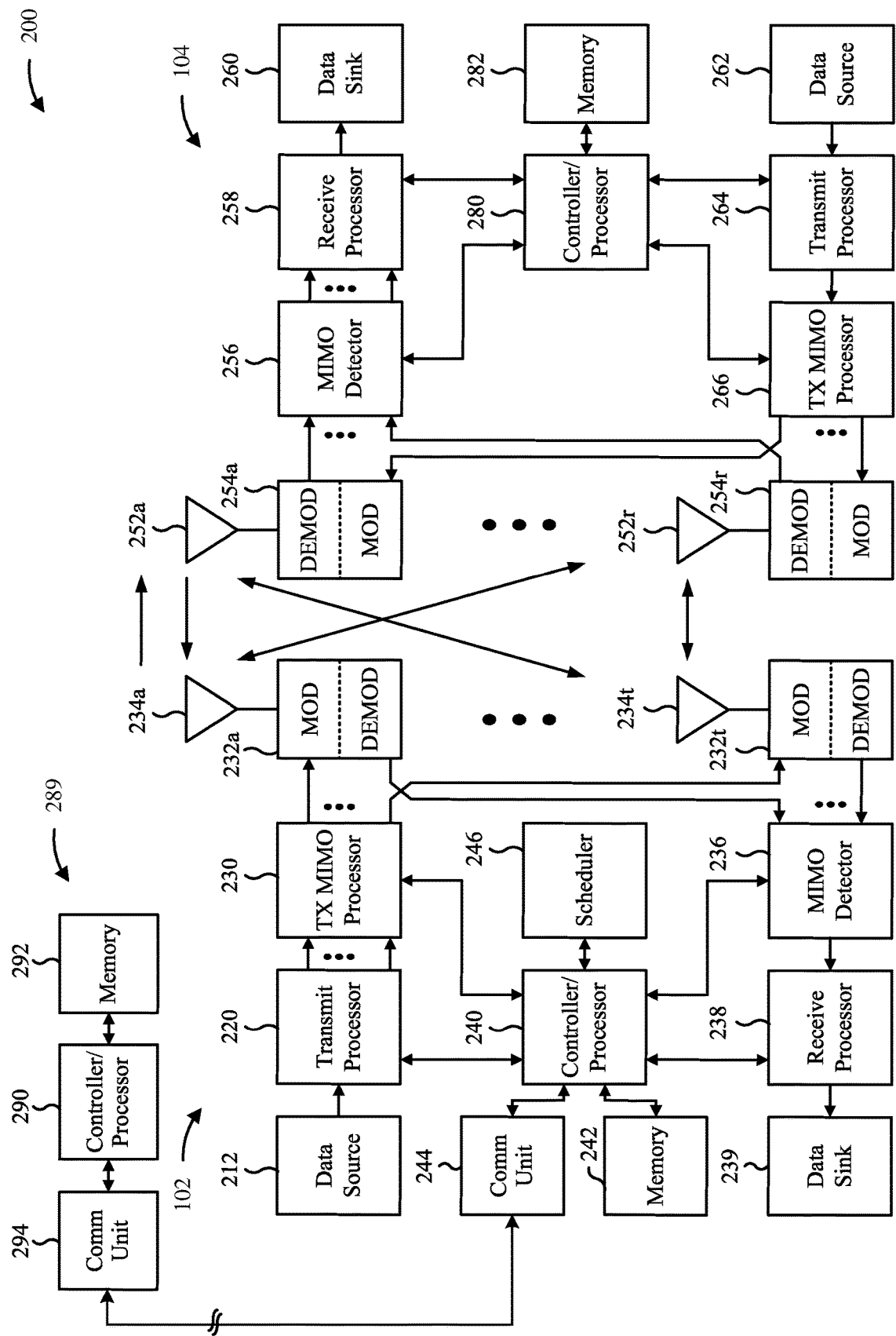
FIG. 2 illustrates a block diagram of a design of a base station and user equipment (UE), which may be one of the base stations and one of the UEs in FIG. 1.

FIG. 2 shows a block diagram of a design 200 of base station 102 and UE 104, which may be one of the base stations and one of the UEs in FIG. 1. Base station 102 may be equipped with T antennas 234a through 234t, and UE 104 may be equipped with R antennas 252a through 252r, where in general T≥1 and R≥1. In some implementations, T antennas 234a through 234t or R antennas 252a through 252r may be part of an antenna array (which may be configured to operate as a phased array). For example, each antenna 234a through 234t may represent a subarray of an antenna array, with the subarray including a plurality of antennas. For implementation considerations, an antenna array may have multiple antennas that are configured together (with the multiple antennas making up a subarray). As such, the power and frequency used to control the antennas of the subarray is the same, allowing fewer oscillators and power supplies to be required than if each antenna is independently configured in the antenna array. In another example, each antenna 234a through 234t or antenna 252a through 252r may be a single antenna.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS) or PRS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, T antennas 234a through 234t may also receive one or more SRSs from UE 104 or transmit one or more PRSs to UE 104.

At UE 104, antennas 252a through 252r may receive the downlink signals from base station 102 and/or other base stations and may provide received signals to demodulators (DEMODs) 254a through 254r, respectively. Each demodulator 254 may condition (e.g., filter, amplify, down convert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor (such as the receive processor 258 or the controller/processor 280) may determine reference signal received power (RSRP), received signal strength indicator (RSSI), reference signal received quality (RSRQ), channel quality indicator (CQI), and/or the like. In some implementations, the controller/processor 280 may measure an AoA, a ZoA, a TOA, and/or other measurements of a PRS received by antennas 252a through 252r. In some aspects, one or more components of UE 104 may be included in a housing.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (such as an SRS). The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 102. At base station 102, the uplink signals from UE 104 and other UEs may be received by antennas 234, processed by demodulators, detected by a MIMO detector 236 if applicable, and further processed by a receive processor 238 to obtain decoded data and control information sent by UE 104. Receive processor 238 may provide the decoded data to a data sink 239 and the decoded control information to controller/processor 240. In some implementations, the controller/processor 240 may measure an AoA, a ZoA, a TOA, and/or other measurements of an SRS received by antennas 234*a* through 234*t*. Base station 102 may include communication unit 244 and communicate to network controller 289 via communication unit 244. Network controller 289 may include communication unit 294, controller/processor 290, and memory 292. The network controller 289 may be location server 172, which may be coupled to the base station 102 via core network 170.

Controller/processor 240 of base station 102, controller/processor 280 of UE 104, controller 290 of network controller 289, which may be location server 172, and/or any other component(s) of FIG. 2 may perform one or more techniques associated with supporting position locationing services for a UE, as described in more detail elsewhere herein. For example, controller/processor 240 of base station 102, controller 290 of network controller 289, controller/processor 280 of UE 104, and/or any other component(s) of FIG. 2 may perform or direct operations of, for example, the processes depicted in the Figures and as described herein. Memories 242, 282, and 292 may store data and program codes for base station 102, UE 104, and network controller 289, respectively. In some aspects, memory 242 and/or memory 282 and/or memory 292 may comprise a non-transitory computer-readable medium storing one or more instructions for wireless communication. For example, the one or more instructions, when executed by one or more processors of base station 102, network controller 289, and/or the UE 104 may perform or direct operations of the processes described herein. A scheduler 246 may schedule UEs for data transmission on the downlink and/or uplink.

The location server 172 (which may include the network controller 289) may be configured to select or indicate which antenna components are to be used to receive a reference signal for UE locationing, to determine a configuration of one or more reference signals for UE locationing, to determine a position of one or more UEs in the wireless network, to store positioning information for the one or more UEs, or to perform other operations associated with positioning of one or more UEs in the wireless network. The positioning information may be used for various operations, such as cell selection, handover, navigation, beamforming, or other aspects of a wireless network 100.

As indicated above, FIG. 2 is provided as an example. Other examples may differ from what is described with regard to FIG. 2. For example, while FIG. 2 depicts communication between a base station 102 and a UE 104, communications may occur between multiple base stations 102 and/or multiple UEs 104.

A base station may broadcast, unicast, or groupcast one or more PRSs in a wireless network (such as in a cellular network including LTE technologies and/or 5G technologies). In a frequency domain, an available bandwidth may be divided into uniformly spaced orthogonal subcarriers (also referred to as "tones" or "bins"). For example, for a normal length cyclic prefix (CP) using, for example, 15 kHz spacing, subcarriers may be grouped into a group of twelve (12) subcarriers. A resource of one OFDM symbol length in the time domain and one subcarrier in the frequency domain may be referred to as a resource element (RE). In the example, each grouping of 12 subcarriers and 14 OFDM symbols is termed a resource block (RB) and, in the example above, the number of subcarriers in the resource block may be written as $N_{SC}^{RB}=12$. For a given channel bandwidth, the number of available resource blocks on each channel, which is also called the transmission bandwidth configuration, is indicated as $N_{RB}^{DL}$. For example, for a 3 MHz channel bandwidth in the above example, the number of available resource blocks on each channel is given by $N_{RB}^{DL}=15$. Note that the frequency component of a resource block (e.g., the 12 subcarriers) is referred to as a physical resource block (PRB).

A base station may transmit radio frames, or other physical layer signaling sequences, supporting PRS signals (i.e., a downlink (DL) PRS) according to frame configurations similar to the above example, which may be measured and used for a target UE position estimation. Other types of wireless nodes (e.g., a distributed antenna system (DAS), remote radio head (RRH), AP, etc.) in a wireless network may also be configured to transmit PRSs configured in a manner similar to (or the same as) described above.

A collection of resource elements that are used for transmission of PRS signals is referred to as a "PRS resource." The collection of resource elements can span multiple PRBs in the frequency domain and N (e.g., 1 or more) consecutive symbol(s) within a slot in the time domain. A "PRS resource set" is a set of PRS resources used for the transmission of PRS signals, where each PRS resource has a PRS resource identifier (ID). In addition, the PRS resources in a PRS resource set are associated with the same TRP. A PRS resource ID in a PRS resource set is associated with a single beam transmitted from a single TRP (where a TRP may transmit one or more beams). Note that this does not have any implications on whether the TRPs and beams from which signals are transmitted are known to the UE.

A PRS may be transmitted in special positioning subframes that are grouped into positioning occasions. A PRS occasion is one instance of a periodically repeated time window (e.g., consecutive slot(s)) where PRSs are expected to be transmitted. Each periodically repeated time window can include a group of one or more consecutive PRS occasions. Each PRS occasion can include a number $N_{PRS}$ of consecutive positioning subframes. The PRS positioning occasions for a cell supported by a base station or a UE may occur periodically at intervals. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station or a UE may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to a UE to enable the UE to perform PRS positioning measurements (also referred to herein as UE locationing measurements). In this manner, the UE may not be expected to blindly perform detection of PRS configurations. Similar to the operations described above for transmitting a DL PRS by a base station, a target UE may transmit UL SRS for positioning, which is received by a base station to enable the base station to perform SRS positioning measurements (also referred to herein as UE locationing measurements). An SRS configuration may be similar to a PRS configuration used by a UE to configure the signal resources to be transmitted for the SRS (which may include one or more resource blocks referred to as SRS resources). As described herein, receiving a reference signal may refer to receiving one or more resources of the reference signal (such as one or more PRS resources or one or more SRS resources).

Figure 3:
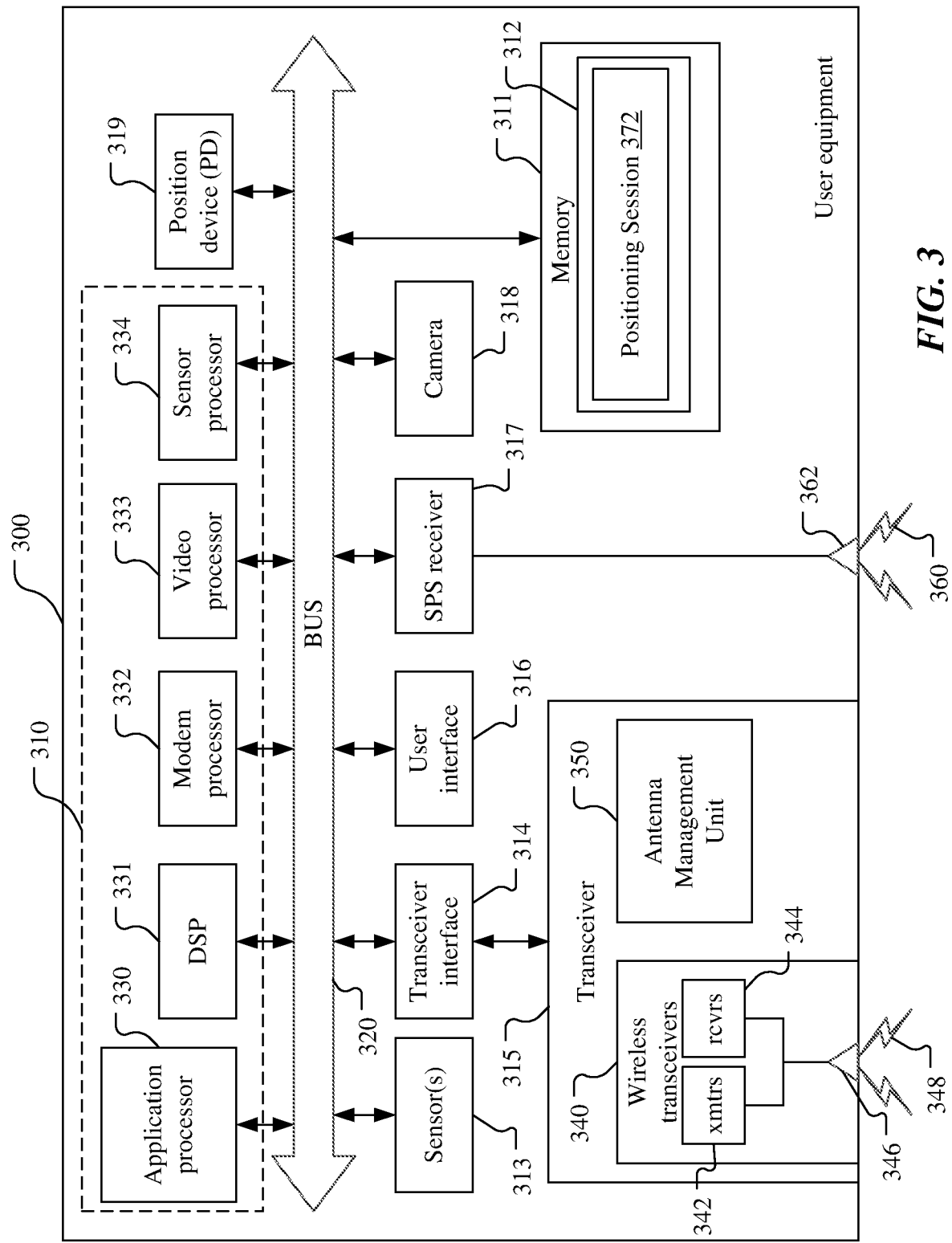
FIG. 3 illustrates a UE capable of supporting position locationing of the UE in a wireless network.

FIG. 3 illustrates a UE 300, which is an example of the UE 104, capable of supporting position locationing services of the UE 300 in a wireless network (such as the wireless network 100). The UE 300 includes a computing platform including at least one processor 310, memory 311 including software (SW) 312, one or more sensors 313, a transceiver interface 314 for a transceiver 315, a user interface 316, a Satellite Positioning System (SPS) receiver 317, a camera 318, and a position device (PD) 319. The processor 310, the memory 311, the sensor(s) 313, the transceiver interface 314, the user interface 316, the SPS receiver 317, the camera 318, and the position device 319 may be communicatively coupled to each other by a bus 320 (which may be configured, e.g., for optical and/or electrical communication). One or more of the shown apparatus (e.g., the camera 318, the SPS receiver 317, and/or one or more of the sensor(s) 313, etc.) may be omitted from the UE 300. The processor 310 may include one or more intelligent hardware devices, e.g., a central processing unit (CPU), a microcontroller, an application specific integrated circuit (ASIC), etc. The processor 310 may comprise multiple processors including an application processor 330, a Digital Signal Processor (DSP) 331, a modem processor 332, a video processor 333, and/or a sensor processor 334. One or more of the processors 330-334 may comprise multiple devices (e.g., multiple processors). For example, the sensor processor 334 may comprise, e.g., processors for radar, ultrasound, and/or lidar, etc. The modem processor 332 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 300 for connectivity. The memory 311 is a non-transitory storage medium that may include random access memory (RAM), flash memory, disc memory, and/or read-only memory (ROM), etc. The memory 311 stores the software 312 which may be processor-readable, processor-executable software code containing instructions that are configured to, when executed, cause the processor 310 to operate as a special purpose computer programmed to perform the various functions described herein. Alternatively, the software 312 may not be directly executable by the processor 310 but may be configured to cause the processor 310, e.g., when compiled and executed, to operate as a special purpose computer to perform the various functions described herein. The description may refer only to the processor 310 performing a function, but this includes other implementations such as where the processor 310 executes software and/or firmware. The description may refer to the processor 310 performing a function as shorthand for one or more of the processors 330-334 performing the function. The description may refer to the UE 300 performing a function as shorthand for one or more appropriate components of the UE 300 performing the function. The processor 310 may include a memory with stored instructions in addition to and/or instead of the memory 311.

The configuration of the UE 300 shown in FIG. 3 is an example and not limiting of the disclosure, including the claims, and other configurations may be used. For example, an example configuration of the UE includes one or more of the processors 330-334 of the processor 310, the memory 311, and the wireless transceiver 340. Other example configurations include one or more of the processors 330-334 of the processor 310, the memory 311, the wireless transceiver 340, and one or more antennas 346.

The UE 300 may comprise the modem processor 332 that may be capable of performing baseband processing of signals received and down-converted by the transceiver 315 and/or the SPS receiver 317. The modem processor 332 may perform baseband processing of signals to be upconverted for transmission by the transceiver 315. Also or alternatively, baseband processing may be performed by the processor 330 and/or the DSP 331. Other configurations, however, may be used to perform baseband processing.

The UE 300 may include the sensor(s) 313 that may include, for example, one or more of various types of sensors such as one or more inertial sensors, one or more barometric pressure sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 300 in three dimensions) and/or one or more gyroscopes capable of detecting motion including rotation of the UE 300. The sensor(s) 313 may include one or more magnetometers to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 313 may generate analog and/or digital signals indications of which may be stored in the memory 311 and processed by the DSP 331 and/or the processor 330 in support of one or more applications such as, for example, applications directed to positioning and/or navigation operations.

The sensor(s) 313 may be used in relative location measurements, relative location determination, motion determination, etc. Information detected by the sensor(s) 313 may be used for motion detection, relative displacement, dead reckoning, sensor-based location determination, and/or sensor-assisted location determination. The sensor(s) 313 may be useful for calibration of a positioning session.

The transceiver 315 may include a wireless transceiver 340 configured to communicate with other devices through wireless connections. For example, the wireless transceiver 340 may include a transmitter 342 and receiver 344 coupled to one or more antennas 346 for transmitting (e.g., on one or more uplink channels and/or one or more sidelink channels) and/or receiving (e.g., on one or more downlink channels and/or one or more sidelink channels) wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 6GPP LTE-V2X (PC5), IEEE 802.11 (including IEEE 802.11p), Wi-Fi, Wi-Fi Direct (Wi-Fi-D), Bluetooth®, Zigbee etc. New Radio may use mm-wave frequencies and/or sub-6 GHz frequencies. While not shown for simplicity, the UE 300 may optionally include a wired transceiver including a transmitter and a receiver configured for wired communication. The wired transmitter may include multiple transmitters that may be discrete components or combined/integrated components, and/or the wired receiver may include multiple receivers that may be discrete components or combined/integrated components. The wired transceiver may be configured, e.g., for optical communication and/or electrical communication. The transceiver 315 may be communicatively coupled to the transceiver interface 314, e.g., by optical and/or electrical connection. The transceiver interface 314 may be at least partially integrated with the transceiver 315.

The transceiver 315 may also optionally include an antenna management unit (AMU) 350, configured to selectively couple antennas of the antennas 346 to radios of the transceiver 315. For example, the AMU 350 may selectively couple signals received from at least a first plurality of antennas or a second plurality of antennas to one or more of a UWB radio or a WLAN radio, as discussed further below with respect to FIG. 6B. In some other aspects, the AMU 350, may control one or more feedforward paths for routing signals received from the first plurality of antennas and second plurality of antennas to radios of the transceiver 315, as discussed further below with respect to FIG. 6A.

The antennas 346 may include an antenna array. The antenna array may be capable of transmit beamforming or receive beamforming, e.g., by increasing the gain setting and/or adjust the phase setting of an array of antennas in a particular direction to amplify (e.g., to increase the gain level of) the RF signals received from that direction. The antennas 346 may further include a plurality of antenna panels, wherein each antenna panel is capable of beamforming. The antennas 346 are capable of adaptation, e.g., selection of one or more antennas for controlling receiving transmitted beams from a base station. A reduced number of beams or a single beam, for example, may be selected for reception of a wide angle beam, e.g., to reduce power consumption, while an increased number of antennas in an antenna array may be selected when the transmit beam is relatively narrow. Instead of controlling each antenna of the antenna array individually, the antenna array may include a plurality of subarrays, with each subarray capable of being controlled independently. For example, the antennas may include a first plurality of antennas which are closely spaced for more accurate AoA determination, and a second plurality of antennas which are much further spaced one from another, in order to achieve better diversity. Alternatively, the antennas 346 may include a plurality of independently controlled antennas which may perform the same functions as the plurality of subarrays. As used herein for the UE 300, an antenna system including a plurality of antenna components may include one or more of the antennas 346, one or more components of the receiver 344, other components of the wireless transceiver 340 not shown (such as power supplies or rails).

The user interface 316 may comprise one or more of several devices such as, for example, a speaker, microphone, display device, vibration device, keyboard, touch screen, etc. The user interface 316 may include more than one of any of these devices. The user interface 316 may be configured to enable a user to interact with one or more applications hosted by the UE 300. For example, the user interface 316 may store indications of analog and/or digital signals in the memory 311 to be processed by DSP 331 and/or the processor 330 in response to action from a user. Similarly, applications hosted on the UE 300 may store indications of analog and/or digital signals in the memory 311 to present an output signal to a user. The user interface 316 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 316 may comprise one or more touch sensors responsive to touching and/or pressure, e.g., on a keyboard and/or touch screen of the user interface 316.

The SPS receiver 317 (e.g., a Global Positioning System (GPS) receiver or other Global Navigation Satellite System (GNSS) receiver) may be capable of receiving and acquiring SPS signals 360 via an SPS antenna 362. The antenna 362 is configured to transduce the wireless signals 360 to wired signals, e.g., electrical or optical signals, and may be integrated with the antenna 346. The SPS receiver 317 may be configured to process, in whole or in part, the acquired SPS signals 360 for estimating a location of the UE 300. For example, the SPS receiver 317 may be configured to determine location of the UE 300 by trilateration/multilateration using the SPS signals 360. The processor 330, the memory 311, the DSP 331, the PD 319 and/or one or more additional specialized processors (not shown) may be utilized to process acquired SPS signals, in whole or in part, and/or to calculate an estimated location of the UE 300, in conjunction with the SPS receiver 317. The memory 311 may store indications (e.g., measurements) of the SPS signals 360 and/or other signals (e.g., signals acquired from the wireless transceiver 340) for use in performing positioning operations. The general-purpose processor 330, the DSP 331, the PD 319, and/or one or more additional specialized processors, and/or the memory 311 may provide or support a location engine for use in processing measurements to estimate a location of the UE 300.

The UE 300 may include the camera 318 for capturing still or moving imagery. The camera 318 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 330 and/or the DSP 331. Also or alternatively, the video processor 333 may perform conditioning, encoding, compression, and/or manipulation of signals representing captured images. The video processor 333 may decode/decompress stored image data for presentation on a display device (not shown), e.g., of the user interface 316.

The position device (PD) 319 may be configured to determine a position of the UE 300, motion of the UE 300, and/or relative position of the UE 300, and/or time. For example, the PD 319 may communicate with, and/or include some or all of, the SPS receiver 317 and the wireless transceiver 340. The PD 319 may work in conjunction with the processor 310 and the memory 311 as appropriate to perform at least a portion of one or more positioning methods, although the description herein may refer only to the PD 319 of the processor 310 being configured to perform, or performing, in accordance with the positioning method(s). The PD 319 may also or alternatively be configured to determine a location of the UE 300 using terrestrial-based signals (e.g., at least some of the signals 348) for trilateration/multilateration, for assistance with obtaining and using the SPS signals 360, or both. The PD 319 may be configured to use one or more other techniques (e.g., relying on the UE's self-reported location (e.g., part of the UE's position beacon)) for determining the location of the UE 300, and may use a combination of techniques (e.g., SPS and terrestrial positioning signals) to determine the location of the UE 300. The PD 319 may include one or more of the sensors 313 (e.g., gyroscope(s), accelerometer(s), magnetometer(s), etc.) that may sense orientation and/or motion of the UE 300 and provide indications thereof that the processor 310 (e.g., the processor 330 and/or the DSP 331) may be configured to use to determine motion (e.g., a velocity vector and/or an acceleration vector) of the UE 300.

The memory 311 may store software 312 that contains executable program code or software instructions that when executed by the processor 310 may cause the processor 310 to operate as a special purpose computer programmed to perform the functions disclosed herein. As illustrated, the memory 311 may include one or more components or modules that may be implemented by the processor 310 to perform the disclosed functions. While the components or modules are illustrated as software 312 in memory 311 that is executable by the processor 310, it should be understood that the components or modules may be stored in another computer readable medium or may be dedicated hardware either in the processor 310 or off the processor. A number of software modules and data tables may reside in the memory 311 and be utilized by the processor 310 in order to manage both communications and the functionality described herein. It should be appreciated that the organization of the contents of the memory 311 as shown is merely exemplary, and as such the functionality of the modules and/or data structures may be combined, separated, and/or be structured in different ways depending upon the implementation.

The memory 311, for example, may include a positioning session module 372 that when implemented by the one or more processors 310 configures the one or more processors 310 to engage in a session to be used for determining a position of the UE using signals received from a selected one of the first plurality of antennas or the second plurality of antennas, as described herein. The positioning session module 372 may also be used to selectively couple either the first plurality of antennas or the second plurality of antennas to the wireless transceivers 340 to receive wireless signals, such as one or more reference signals, for determining the position of the UE. While the positioning session module 372 is depicted as being software included in memory 311, the positioning session module 372 may be a hardware module, a software module, or a combination of hardware and software. For example, the module may include one or more application specific integrated circuits (ASICs), executable code, or a combination of both.

As noted above, for AoA based UE locationing, one or more PRS may be transmitted from a base station to a UE or one or more SRS may be transmitted from a UE to a base station (with an AoA and/or ZoA being measured for the received reference signal to indicate a direction of the UE from the base station). A distance between a base station and a UE may be based on a TOA, which may be used to determine an OTDOA, an RTT, an RSTD, or any other suitable measurements used to determine a distance of a UE from a base station for positioning. In some implementations, specific resources of a reference signal (such as a PRS or an SRS) may be used for determining a TOA or otherwise used to measure the distance between a UE and a base station. Specific resources of a reference signal may also be used for calculating an angle measurement to indicate a direction of the UE from the base station. A location of the UE with reference to the base station may be determined based on the direction of the UE from the base station and the distance of the UE from the base station.

Figure 4:
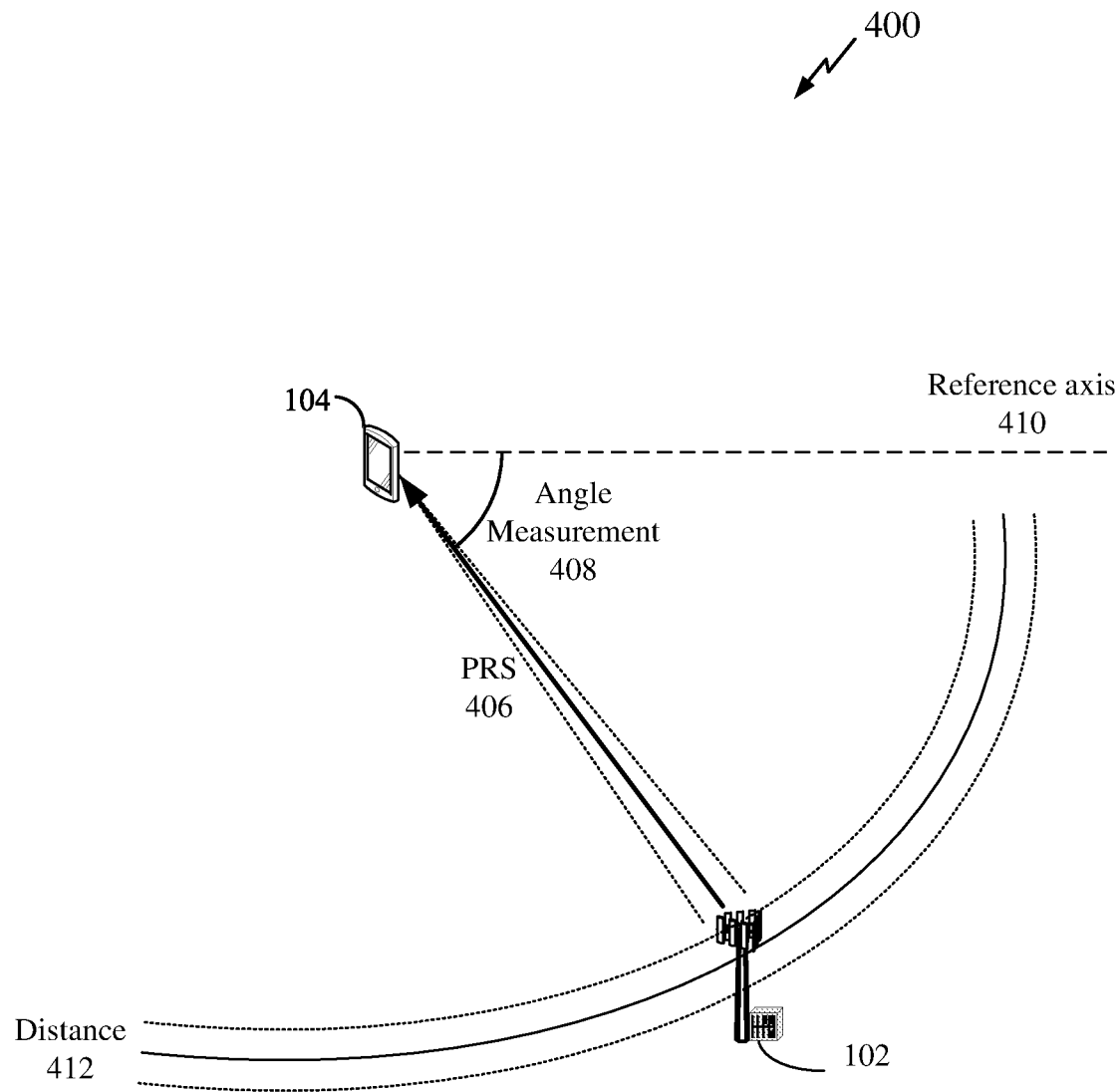
FIG. 4 illustrates an exemplary wireless communications system implementing UE locationing using a DL AoA technique.

FIG. 4 illustrates an exemplary wireless communications system 400 implementing UE locationing using a DL AoA technique. In the example of FIG. 4, a UE 104 may generate an angle measurement 608 to be used in determining an estimate of the position of the UE 104 relative to a base station 102. The UE 104 and base station 102 may communicate wirelessly, which may correspond to any combination of a UE 104 and base station 102 in FIG. 1, using RF signals and standardized protocols for the modulation of the RF signals and the exchange of information packets. By extracting different types of information from the exchanged RF signals, and utilizing the layout of the wireless communications system 600 (i.e., the base stations' locations, geometry, etc.), the UE 104 may determine the position of the base station 102 in a predefined reference coordinate system. In an aspect, the position may be specified with reference to an angle measurement in a two-dimensional coordinate space (such as latitude and longitude); however, the aspects disclosed herein are not so limited, and may also be applicable to determining angle measurements using a three-dimensional coordinate system (such as latitude, longitude, and elevation) if the extra dimension is desired. Additionally, while FIG. 4 illustrates one UE 104 and one base station 102, as will be appreciated, there may be more UEs 104 and more or fewer base stations 102.

For DL AoA based UE locationing, the base station 102 transmits a PRS 606 to the UE 104. The UE 104 receives the PRS 606 and generates an angle measurement 608. For example, the UE 104 may use an antenna array to determine the direction from which the PRS 606 is received. For example, the UE 104 may receive the PRS 606 using the first plurality of antennas, which are closely spaced. A reference axis 610 (which may be any suitable direction, such as true north for two-dimensional angles or perpendicular to the azimuth for three-dimensional angles) may be compared to the direction from which the PRS 606 is received to compute the angle measurement 608. The angle measurement 608 may be one or both of an AoA or ZoA of the PRS 606. Because of potential tolerances in the antenna components for receiving the PRS 606, the PRS 606 (which is measured as being received along the solid line for PRS 606) may be received slightly askew from the measured direction (such as within the cone between the dashed lines from the base station 102 to the UE 104).

The operations for determining a position of a UE using UL AoA based UE locationing is similar to as described above with reference to DL AoA based UE locationing, except that the base station 102 receives SRS from one or more UEs and determines (or assists in determining) one or more angle measurements from the SRS.

As noted above, antennas which are closely spaced, for example such that neighboring antennas are located within half a wavelength of received wireless signals, may be well-configured for determining the angle of arrival of wireless signals, while antennas which are spaced further apart may provide better antenna diversity and combination gain, and may be better configured for ranging and data communication applications.

Figure 5:
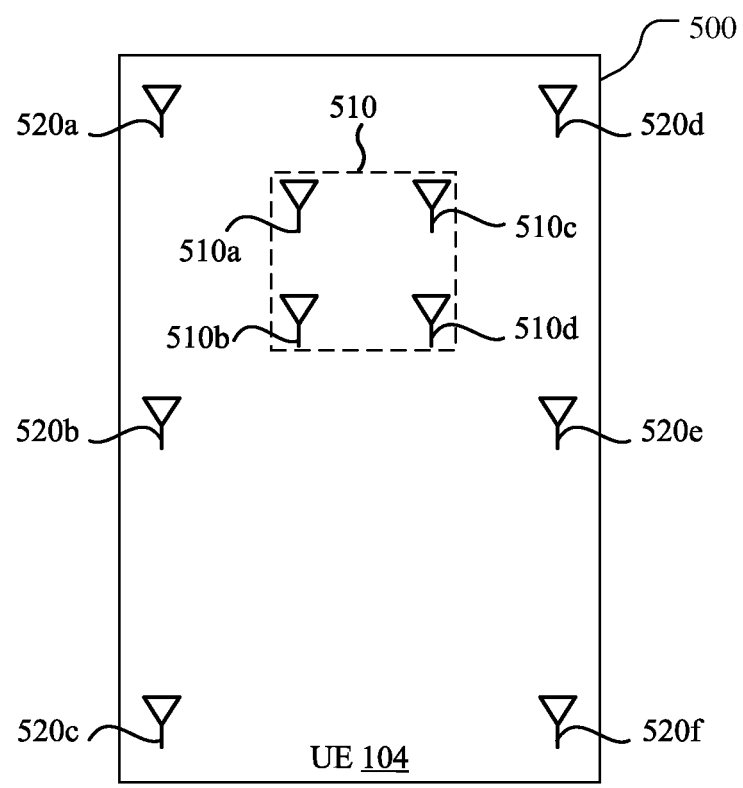
FIG. 5 shows an example antenna configuration for a UE, according to some implementations

As described herein, a UE may include a first plurality of antennas which are closely spaced, for AoA operations, in addition to a second plurality of antennas which are more widely spaced, for ranging and data communication operations. FIG. 5 shows an example antenna configuration 500 for a UE 104, according to some implementations. The antenna configuration 500 includes antennas 510a-510d (collectively antennas 510) and antennas 520a-520f (collectively antennas 520). The antennas 510 are shown to be closely spaced, with each antenna of the antennas 510 located within a threshold distance of each neighboring antenna of the antennas 510. For example, this threshold distance my correspond to half a wavelength of the wireless signals to be used for AoA determinations. Further, the antennas 520 are much more widely spaced, with each antenna being located at a distance exceeding the threshold distance. The antennas 510 may be one example of the first plurality of antennas, while the antennas 520 may be one example of the second plurality of antennas. Note that while antennas 510 and antennas 520 are shown to include 4 and 6 antennas respectively, that the antennas 510 and 520 may include any number of antennas. Further, the specific configuration shown in FIG. 5 is only one example configuration of the antennas 510, and that any other configuration may be permissible, as long as each antenna of the antennas 510 is located within the threshold distance of each neighboring antenna of the antennas 510. Similarly any other configuration of the antennas 520 is permissible if each antenna of the antennas 520 is located farther than the threshold distance from each neighboring antenna of the antennas 520.

As discussed above, the first plurality of antennas and the second plurality of antennas may each be coupled to transceiver circuitry, such as radios and modems, associated with each of a number of wireless communication technologies supported by a UE. For example, a UE may be capable of operating in accordance with a UWB wireless communication technologies, in accordance with a WLAN wireless communication technology, in accordance with a 5G NR wireless communication technology, and so on. External switching circuitry or internal switching, such as one or more feedforward paths, may be used for selectively coupling the first plurality of antennas and the second plurality of antennas to the receiver circuitry associated with each wireless communication technology.

Figure 6A:
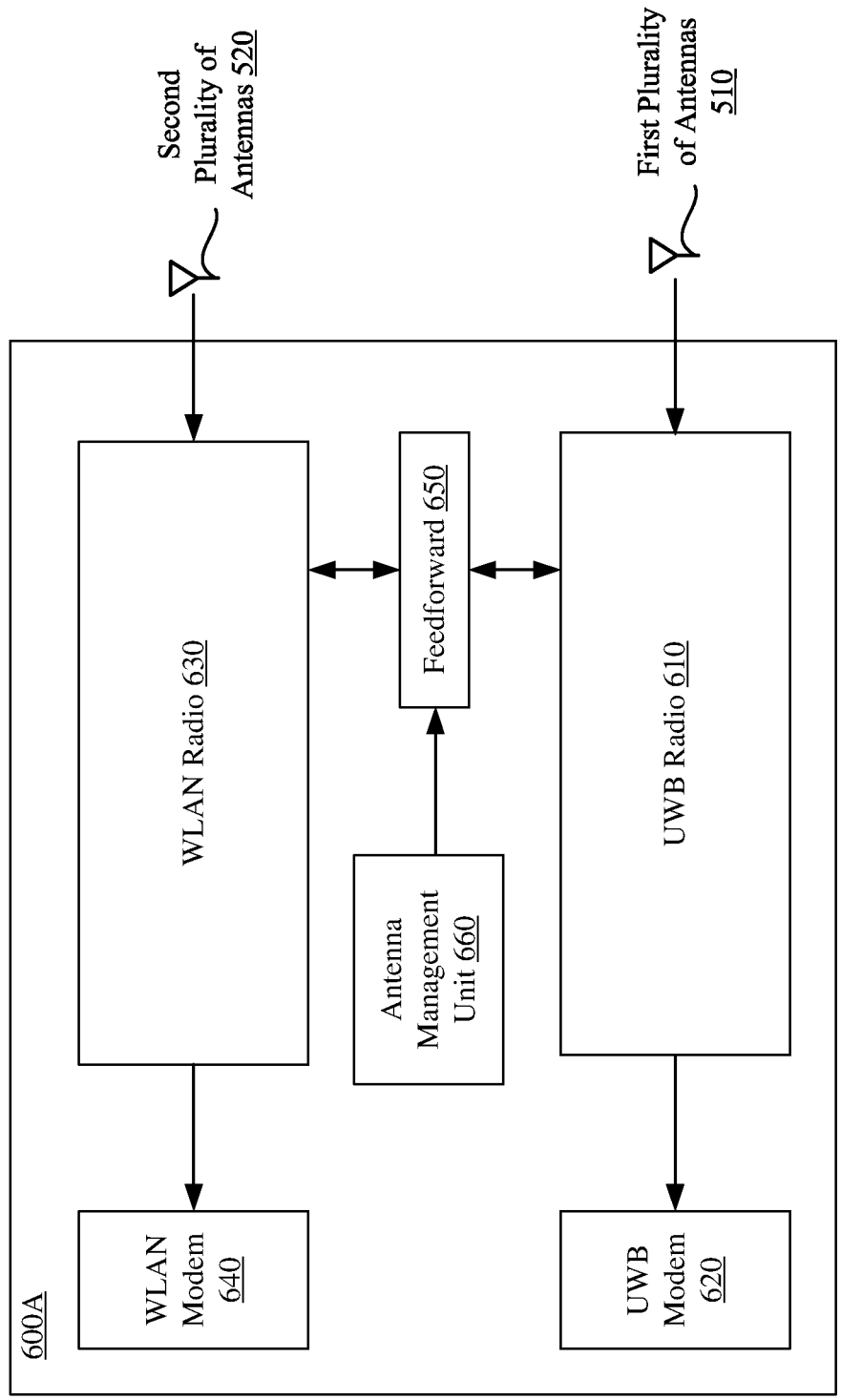
FIG. 6A shows a circuit incorporating a feedforward path for coupling the antennas to each of multiple receivers, in accordance with some implementations.

FIG. 6A shows a circuit 600A incorporating a feedforward path for coupling the antennas to each of multiple receivers, in accordance with some implementations. The circuit 600A is shown to include WLAN receiver circuitry in addition to UWB receiver circuitry. More particularly, the WLAN receiver circuitry and the UWB receiver circuitry may both be included in a common chip which is coupled to each of the first plurality of antennas 510 and the second plurality of antennas 520. The UWB receiver circuitry may include a UWB radio 610 and a UWB modem 620, while the WLAN receiver circuitry may include a WLAN radio 630 and a WLAN modem 640. Each of the UWB radio 610 and the WLAN radio 630 may include components such as low noise amplifiers, transconductance amplifiers, filters, such as low pass filters, analog to digital converters, and so on. A feedforward path 650 may connect the UWB radio 610 and the WLAN radio 630, in order to couple the first plurality of antennas 510 to the WLAN radio 630 when required, and in order to couple the second plurality of antennas 520 to the UWB radio when required. For example, the feedforward path 650 may be controlled by an antenna management unit 660. The antenna management unit 660 may be one example of the AMU 350 of FIG. 3. Note that the internal switching or feedforward paths shown in FIG. 6A is only one example of such internal switching which may be used in accordance with the example implementations, and that the internal switching may take any other suitable form for coupling each of the first plurality of antennas 510 and the second plurality of antennas 520 to each receiver circuitry. Note also that while FIG. 6A shows receiver circuitry for two wireless communication technologies, that the internal switching may couple the antennas to each receiver circuit of any number of wireless communication technologies.

Figure 6B:
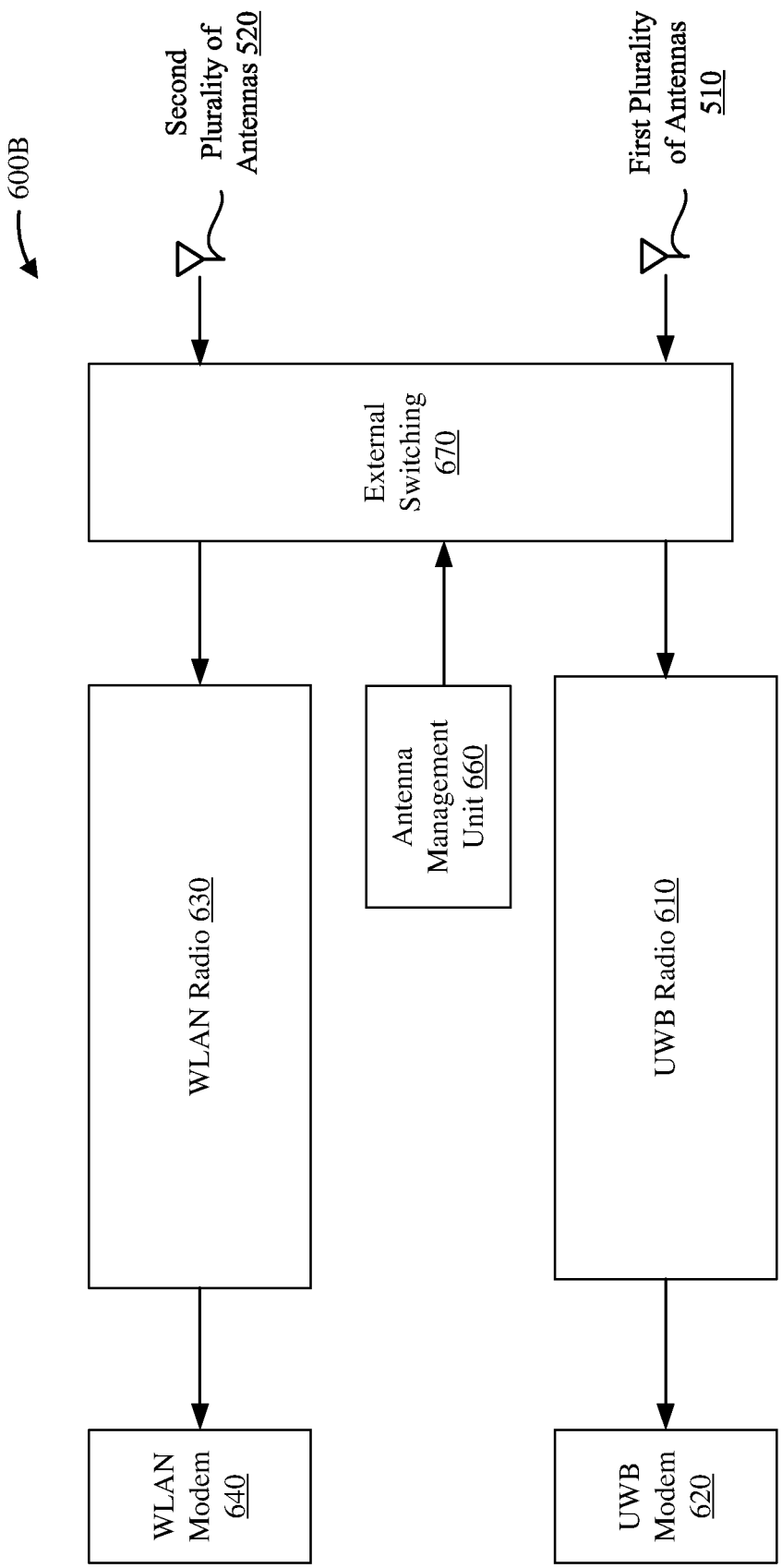
FIG. 6B shows a circuit incorporating external switching for coupling the antennas to each of multiple receivers, in accordance with some implementations.

FIG. 6B shows a circuit 600B incorporating external switching for coupling the antennas to each of multiple receivers, in accordance with some implementations. As discussed above with respect to FIG. 3, in some aspects, external switching 670 may selectively couple each of the first plurality of antennas and the second plurality of antennas to each of multiple receiver circuits. For example, the external switching 670 may be controlled by the antenna management unit 660, which may be one example of the AMU 350 of FIG. 3. FIG. 6B shows a circuit 600B including an antenna management unit 660 for selectively coupling each of the first plurality of antennas 510 and the second plurality of antennas 520 to each of the UWB radio 610/ UWB modem 620 and the WLAN radio 630/WLAN modem 640. Note also that while FIG. 6B shows receiver circuitry for two wireless communication technologies, that the external switching may couple the antennas to each receiver circuit of any number of wireless communication technologies.

As discussed above, the example implementations may selectably couple the first plurality of antennas and the second plurality of antennas to receiver circuitry associated with each of two or more wireless communication technologies. Given that applications associated with more than one receiver may concurrently request access to the antennas, it would be desirable to fairly assign access to one of the requests. Further, in some aspects, a request for positioning may be received from an application which may use any available wireless communication technology. In some aspects, this may be called a request for "coordinated positioning." In response to such a request, a wireless communication technology may be selected for performing the positioning according to one or more metrics, such as accuracy, power consumption, effective range, availability of a wireless communication technology due to various regulatory requirements, and so on.

Figure 7:
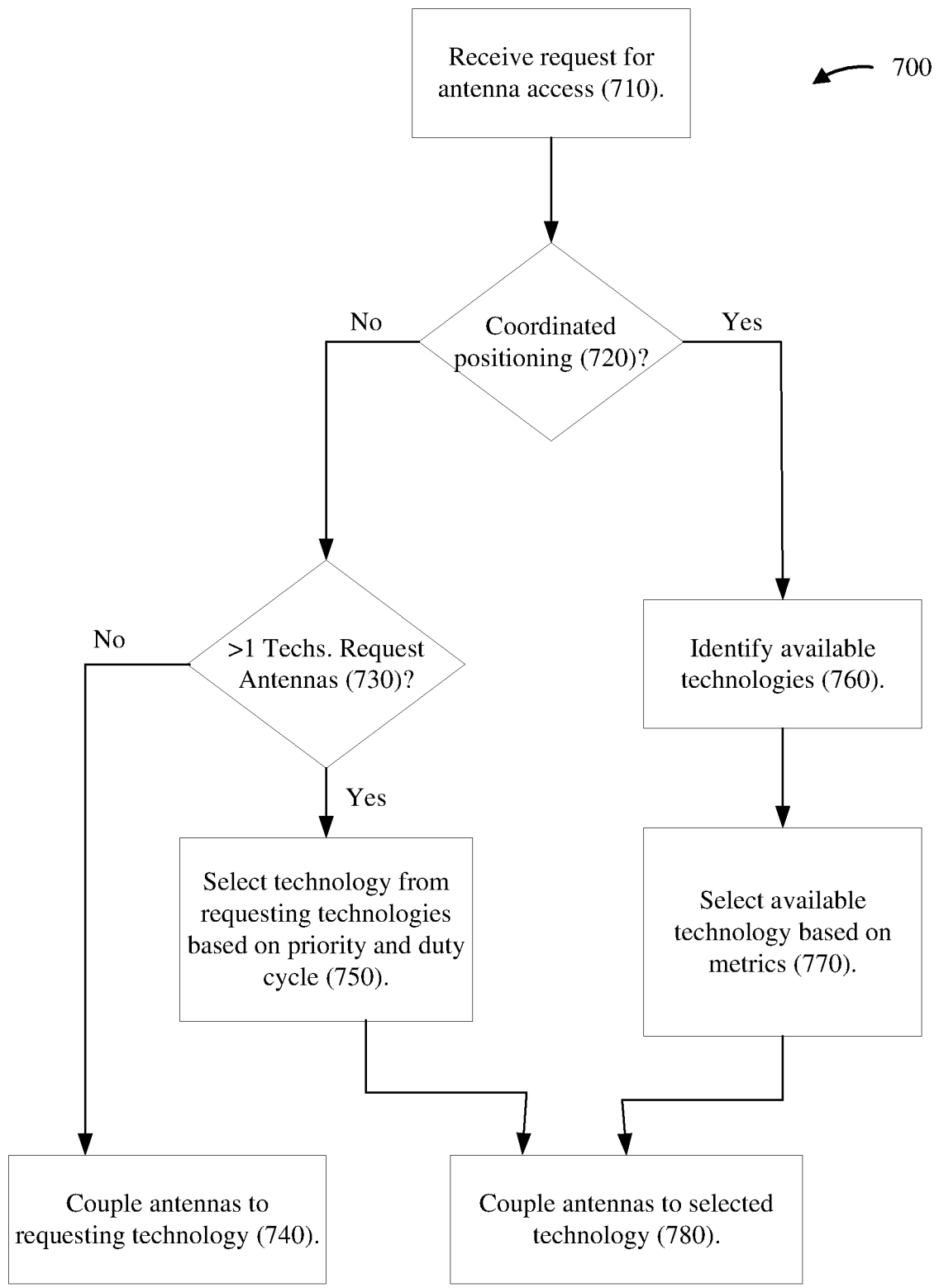
FIG. 7 shows a flowchart for an example method for coupling antennas of a UE to receiver circuitry associated with one of two or more wireless communication technologies, according to some implementations.

FIG. 7 shows a flowchart for an example method 700 for coupling antennas of a UE to receiver circuitry associated with one of two or more wireless communication technologies, according to some implementations. The method 700 may be performed by any suitable device of a wireless network, such as a UE 104 of FIG. 1, in a manner consistent with disclosed implementations. The method 700 may be performed by any suitable device of a wireless network, such as a UE 104 shown in FIG. 1, in a manner consistent with disclosed implementations. A device that may perform one or more operations in method 700 may include an antenna system including a plurality of antenna components, at least one transceiver (such as one or more wireless transceivers and/or one or more wired transceivers), at least one memory, and at least one processor coupled to the at least one transceiver and the at least one memory. The antenna system may include antennas 346 and/or other suitable components, the at least one transceiver may include the transceiver 315 or the wireless transceiver 340, the at least one memory may include the memory 311, and the at least one processor may include one or more of the processor 310, one or more of processors 330-334, or the position device 319.

At block 710, the device receives a request for antenna access. The request for antenna access may be a request for positioning of the device, a request for data communication, a request for ranging, and so on. At block 720, the device determines whether or not the received request is a request for coordinated positioning.

If the request is not a request for coordinated positioning, then at block 730 the device determines whether or not requests for concurrent access by more than one wireless communication technology have been received. If only a single wireless communication technology has requested access to the antennas, then at block 740, the requested antennas are coupled to receiver circuitry for the wireless communication technology associated with the received request. For example, such receiver circuitry may be included in transceiver circuitry configured to transmit and receive wireless communication signals.

If requests for concurrent access by more than one wireless communication technology have been received, then at block 750, one of the two or more wireless communication technologies are selected for antenna access. This selection may be based on a priority assigned to each of the two or more wireless communication technologies. For example, three wireless communication technologies A, B, and C may request antenna access, with P(A), P(B) and P(C) representing the priorities of the respective technologies. For example, technologies A, B, and C may represent UWB, WLAN, and 5G NR technologies. If requests for concurrent antenna access are received associated with technologies A and B, then the antennas may be assigned to technology A when P(A)−P(B)>P_TH, and to technology B when P(B)−P(A)>P_TH, where P_TH is a threshold difference in priority. For example, when P_TH is zero, then the technology associated with the higher priority wins access to the antennas. In some aspects, P_TH may be greater than zero. When P_TH is greater than zero, then a duty cycle associated with each technology may be used to ensure fairness. For example, let D(A), D(B) and D(C) be the duty cycles associated with the respective technologies A, B, and C. When P_TH is greater than zero, then no technology may win access to the antennas based on priority. If P(A) is greater than P(B) but not more than P_TH greater than P(B), then if D(A)−D(B)>D_TH, then technology B may win access to the antennas, where D_TH is a duty cycle threshold. That is, when the priority associated with technology A exceeds the priority associated with technology B, but the duty cycle associated with technology A is sufficiently larger than the duty cycle associated with technology B, then B may still win access to the antennas, in order to ensure fairness of antenna access, and that technology B remains capable of winning access despite its low duty cycle. At block 780, the antennas are coupled to transceiver circuitry associated with the selected wireless communication technology.

When the received request is a request for coordinated positioning, then at block 760, the wireless communication technologies which are available for coordinated position are selected. For example, a regulatory body associated with a location of the device may forbit access to an otherwise available wireless communication technology, and so on. After identifying the available wireless communication technologies, at block 770, an available wireless communication technology is selected for performing the coordinated positioning based on one or more metrics. For example, such metrics may be based on criteria such as positioning accuracy of each available wireless communication technology, a power consumption associated with positioning using each of the available wireless communication technologies, on an effective range of positioning using each of the available wireless communication technologies, and so on. In some aspects, a score may be assigned to each available wireless communication technology based on the one or more criteria, and an overall metric determined based on a combination of these scores, such as a linear combination of the scores, in order to select a wireless communication technology for performing the coordinated positioning. At block 780, the antennas are coupled to transceiver circuitry associated with the selected wireless communication technology.

Figure 8:
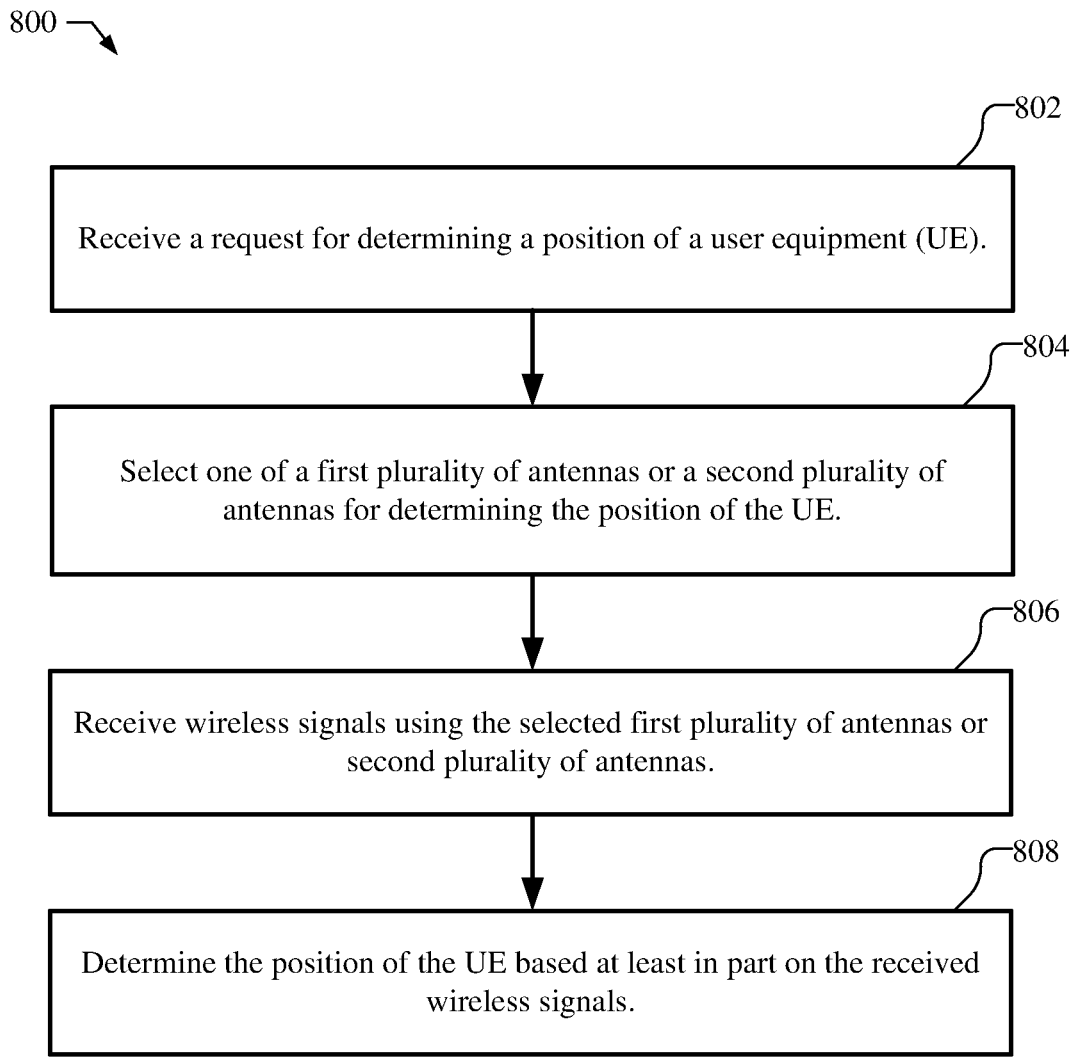
FIG. 8 shows a flowchart for an exemplary method for supporting position locationing of a UE in a wireless network, according to some implementations.

FIG. 8 shows a flowchart for an exemplary method 800 for supporting position locationing of a UE in a wireless network, according to some implementations. The exemplary method 800 may be performed by any suitable device of a wireless network, such as a UE 104 or a base station 102 shown in FIG. 1, in a manner consistent with disclosed implementations. A device that may perform one or more operations in method 800 may include an antenna system including a plurality of antenna components, at least one transceiver (such as one or more wireless transceivers and/or one or more wired transceivers), at least one memory, and at least one processor coupled to the at least one transceiver and the at least one memory. The antenna system may include antennas 346 and/or other suitable components, the at least one transceiver may include the transceiver 315 or the wireless transceiver 340, the at least one memory may include the memory 311, and the at least one processor may include one or more of the processor 310, one or more of processors 330-334, or the position device 319.

At block 802, the device receives a request for determining a position of a user equipment (UE). A means for receiving the request for determining the position of the UE may include one or more of the processor 310, the memory 311, the transceiver 315 the antennas 346, the first plurality of antennas 510 and the second plurality of antennas 520.

At block 804, the device selects one of a first plurality of antennas or a second plurality of antennas for determining the position of the UE. A means for selecting one of the first plurality of antennas or the second plurality of antennas may include one or more of the processor 310, the memory 311, the transceiver 315, the AMU 350, and the positioning session 372.

At block 806, the device receives wireless signals using the selected first plurality of antennas or second plurality of antennas. A means for receiving wireless signals using the selected first plurality of antennas or second plurality of antennas may include one or more of the processor 310, the memory 311, the transceiver 315, the AMU 350, the antennas 346, the first plurality of antennas 510 and the second plurality of antennas 520.

At block 808, the device determines a position of the UE based at least in part on the received wireless signals. A means for determining the location of the UE based at least in part on the received wireless signals may include one or more of the processor 310, the memory 311, and the positioning session 372.

In some aspects, each antenna of the first plurality of antennas is located within a threshold distance of each other antenna of the first plurality of antennas, and each antenna of the second plurality of antennas is located more than the threshold distance from each other antenna of the second plurality of antennas. In some aspects, the threshold distance corresponds to half a wavelength of the received wireless signals. In some aspects, the first plurality of antennas is selected, and determining the position of the UE in block 808 includes determining the position of the UE based at least in part on an angle of arrival (AoA) of the received wireless signals.

In some aspects, selecting one of the first plurality of antennas or the second plurality of antennas in block 806 includes selecting a wireless communication technology of two or more wireless communication technologies for determining the position of the UE. In some aspects, selecting one of the first plurality of antennas or the second plurality of antennas in block 806 includes coupling the selected first plurality of antennas or second plurality of antennas to a wireless receiver associated with the selected wireless communication technology. In some aspects, the two or more wireless communication technologies include one or more of an ultrawideband (UWB) wireless communication technology, a Wi-Fi wireless communication technology, and a 5G new radio (NR) wireless communication technology. In some aspects, selecting the wireless communication technology is based at least in part on a positioning accuracy associated with each of the two or more wireless communication technologies. In some aspects, selecting the wireless communication technology is based at least in part on a power consumption associated with each of the two or more wireless communication technologies. In some aspects, selecting the wireless communication technology is based at least in part on a maximum range associated with each of the two or more wireless communication technologies.

In some aspects, the request received in block 802 includes a requested wireless communication technology for determining the position of the UE, and the method 800 further includes coupling the selected first plurality of antennas or second plurality of antennas to a receiver associated with the requested wireless communication technology.

In some aspects, the method 800 further includes identifying a wireless communication technology associated with the received request, determining that two or more wireless communication technologies have concurrently requested use of the selected first plurality of antennas or second plurality of antennas, selecting one wireless communication technology for use of the selected first plurality of antennas or second plurality of antennas, and coupling the selected first plurality of antennas or second plurality of antennas to a receiver associated with the selected wireless communication technology. In some aspects, the wireless communication technology is selected based at least in part on respective priorities associated with each wireless communication technology of the two or more wireless communication technology. In some aspects, the wireless communication technology is selected based at least in part on respective duty cycles associated with each wireless communication technology of the two or more wireless communication technology. A means for identifying the wireless communication technology associated with the received request may include one or more of the processor 310, the memory 311, and the positioning session 372. A means for determining that two or more wireless communication technologies have concurrently requested use of the selected first plurality of antennas or second plurality of antennas may include one or more of the processor 310, the memory 311, and the positioning session 372. A means for selecting one wireless communication technology for use of the selected first plurality of antennas or second plurality of antennas may include one or more of the processor 310, the memory 311, and the positioning session 372. A means for coupling the selected first plurality of antennas or second plurality of antennas to a receiver associated with the selected wireless communication technology may include one or more of the processor 310, the memory 311, the transceiver, 315, the AMU 350, the feedforward paths 650, the AMU 660, and the external switching 670.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

1. A method for supporting position locationing of a user equipment (UE) in a wireless network including:
   receiving a request for determining a position of the UE;
   selecting one of a first plurality of antennas or a second plurality of antennas coupled to the UE;
   receiving wireless signals using the selected first plurality of antennas or the second plurality of antennas; and
   determining the position of the UE based at least in part on the received wireless signals.

2. The method of clause 1, wherein each antenna of the first plurality of antennas is located within a threshold distance of each other antenna of the first plurality of antennas, and wherein each antenna of the second plurality of antennas is located more than the threshold distance from each other antenna of the second plurality of antennas.

3. The method of clause 2, wherein the threshold distance corresponds to half a wavelength of the received wireless signals.

4. The method of clause 3, wherein the first plurality of antennas is selected, and wherein the position of the UE is determined based at least in part on an angle of arrival (AoA) of the received wireless signals.

5. The method of clause 1, wherein selecting one of the first plurality of antennas or the second plurality of antennas is based on a wireless communication technology selected for determining the position of the UE.

6. The method of claim 5, wherein the wireless communication technology is selected from two or more wireless communication technologies.

7. The method of clause 6, wherein selecting one of the first plurality of antennas or the second plurality of antennas includes coupling the selected first plurality of antennas or second plurality of antennas to a wireless receiver associated with the selected wireless communication technology.

8. The method of clause 6, wherein the two or more wireless communication technologies include one or more of an ultrawideband (UWB) wireless communication technology, a Wi-Fi wireless communication technology, and a 5G new radio (NR) wireless communication technology.

9. The method of clause 6, wherein selecting the wireless communication technology is based at least in part on a positioning accuracy associated with each of the two or more wireless communication technologies.

10. The method of clause 6, wherein selecting the wireless communication technology is based at least in part on a power consumption associated with determining the position of the UE using each of the two or more wireless communication technologies.

11. The method of clause 6, wherein selecting the wireless communication technology is based at least in part on a maximum range associated with each of the two or more wireless communication technologies.

12. The method of clause 1, wherein the received request includes a requested wireless communication technology for determining the position of the UE, and wherein the method further includes coupling the selected first plurality of antennas or second plurality of antennas to a receiver associated with the requested wireless communication technology.

13. The method of clause 1, further including:
   identifying a wireless communication technology associated with the received request;
   determining that two or more wireless communication technologies have concurrently requested use of the selected first plurality of antennas or second plurality of antennas;
   selecting one wireless communication technology for use of the selected first plurality of antennas or second plurality of antennas; and
   coupling the selected first plurality of antennas or second plurality of antennas to a receiver associated with the selected wireless communication technology.

14. The method of clause 13, wherein the wireless communication technology is selected based at least in part on respective priorities associated with each wireless communication technology of the two or more wireless communication technologies.

15. The method of clause 13, wherein the wireless communication technology is selected based at least in part on respective duty cycles associated with each wireless communication technology of the two or more wireless communication technologies.

16. A device configured for supporting position locationing of a user equipment (UE) in a wireless network, including:
   an antenna system including at least a first plurality of antennas and a second plurality of antennas;
   at least one transceiver coupled to the antenna system;
   at least one memory; and
   at least one processor coupled to the at least one transceiver and the at least one memory, wherein the at least one processor is configured to cause the device to:
      receive a request for determining a position of the UE;
      select one of the first plurality of antennas or the second plurality of antennas for determining the position of the UE;
      receive wireless signals using the selected first plurality of antennas or the second plurality of antennas; and
      determine the position of the UE based at least in part on the received wireless signals.

17. The device of clause 16, wherein each antenna of the first plurality of antennas is located within a threshold distance of each other antenna of the first plurality of antennas, and wherein each antenna of the second plurality of antennas is located more than the threshold distance from each other antenna of the second plurality of antennas.

18. The device of clause 17, wherein the threshold distance corresponds to half a wavelength of the received wireless signals.

19. The method of clause 18, wherein the first plurality of antennas is selected, and wherein the position of the UE is determined based at least in part on an angle of arrival (AoA) of the received wireless signals.

20. The device of clause 16, wherein selecting one of the first plurality of antennas or the second plurality of antennas is based on a wireless communication technology selected for determining the position of the UE.

21. The device of clause 20, wherein the wireless communication technology is selected from two or more wireless communication technologies.

22. The device of clause 21, wherein selecting one of the first plurality of antennas or the second plurality of antennas includes coupling the selected first plurality of antennas or second plurality of antennas to a wireless receiver associated with the selected wireless communication technology.

23. The device of clause 21, wherein the selected first plurality of antennas or second plurality of antennas is coupled to the wireless receiver associated with the selected wireless communication technology using one or more switches.

24. The device of clause 21, wherein the selected first plurality of antennas or second plurality of antennas is coupled to the wireless receiver associated with the selected wireless communication technology using an internal feedforward circuit.

25. The device of clause 21, wherein the two or more wireless communication technologies include one or more of an ultrawideband (UWB) wireless communication technology, a Wi-Fi wireless communication technology, and a 5G new radio (NR) wireless communication technology.

26. The device of clause 21, wherein selecting the wireless communication technology is based at least in part on a positioning accuracy associated with each of the two or more wireless communication technologies.

27. The device of clause 21, wherein selecting the wireless communication technology is based at least in part on a power consumption associated with determining the position of the UE using each of the two or more wireless communication technologies.

28. The device of clause 21, wherein selecting the wireless communication technology is based at least in part on a maximum range associated with each of the two or more wireless communication technologies.

29. The device of clause 16, wherein the received request includes a requested wireless communication technology for determining the position of the UE, and wherein the method further includes coupling the selected first plurality of antennas or second plurality of antennas to a receiver associated with the requested wireless communication technology.

30. The device of clause 16, wherein the at least one processor is further configured to cause the device to:
   identify a wireless communication technology associated with the received request;
   determine that two or more wireless communication technologies have concurrently requested use of the selected first plurality of antennas or second plurality of antennas;
   select one wireless communication technology for use of the selected first plurality of antennas or second plurality of antennas; and
   couple the selected first plurality of antennas or second plurality of antennas to a receiver associated with the selected wireless communication technology.

31. The method of clause 30, wherein the wireless communication technology is selected based at least in part on respective priorities associated with each wireless communication technology of the two or more wireless communication technologies.

32. The method of clause 30, wherein the wireless communication technology is selected based at least in part on respective duty cycles associated with each wireless communication technology of the two or more wireless communication technologies.

33. A non-transitory computer readable storage medium storing instructions for execution by one or more processors of a device configured for supporting position locationing of a user equipment (UE) in a wireless network, wherein execution of the instructions causes the device to perform operations including:
   receiving a request for determining a position of the UE;
   selecting one of a first plurality of antennas or a second plurality of antennas coupled to the UE;
   receiving wireless signals using the selected first plurality of antennas or the second plurality of antennas; and
   determining the position of the UE based at least in part on the received wireless signals.

34. The non-transitory computer readable storage medium of clause 33, wherein each antenna of the first plurality of antennas is located within a threshold distance of each other antenna of the first plurality of antennas, and wherein each antenna of the second plurality of antennas is located more than the threshold distance from each other antenna of the second plurality of antennas.

35. The non-transitory computer readable storage medium of clause 34, wherein the threshold distance corresponds to half a wavelength of the received wireless signals.

36. The non-transitory computer readable storage medium of clause 35, wherein the first plurality of antennas is selected, and wherein the position of the UE is determined based at least in part on an angle of arrival (AoA) of the received wireless signals.

37. The non-transitory computer readable storage medium of clause 33, wherein selecting one of the first plurality of antennas or the second plurality of antennas is based on a wireless communication technology selected for determining the position of the UE.

38. The non-transitory computer readable storage medium of clause 37, wherein the wireless communication technology is selected from two or more wireless communication technologies.

39. The non-transitory computer readable storage medium of clause 38, wherein selecting one of the first plurality of antennas or the second plurality of antennas includes coupling the selected first plurality of antennas or second plurality of antennas to a wireless receiver associated with the selected wireless communication technology.

40. The non-transitory computer readable storage medium of clause 38, wherein the two or more wireless communication technologies include one or more of an ultrawideband (UWB) wireless communication technology, a Wi-Fi wireless communication technology, and a 5G new radio (NR) wireless communication technology.

41. The non-transitory computer readable storage medium of clause 38, wherein selecting the wireless communication technology is based at least in part on a positioning accuracy associated with each of the two or more wireless communication technologies.

42. The non-transitory computer readable storage medium of clause 38, wherein selecting the wireless communication technology is based at least in part on a power consumption associated with determining the position of the UE using each of the two or more wireless communication technologies.

43. The non-transitory computer readable storage medium of clause 38, wherein selecting the wireless communication technology is based at least in part on a maximum range associated with each of the two or more wireless communication technologies.

44. The non-transitory computer readable storage medium of clause 33, wherein the received request includes a requested wireless communication technology for determining the position of the UE, and wherein the method further includes coupling the selected first plurality of antennas or second plurality of antennas to a receiver associated with the requested wireless communication technology.

45. The non-transitory computer readable storage medium of clause 33, wherein execution of the instructions causes the device to perform operations further including:
    identifying a wireless communication technology associated with the received request;
    determining that two or more wireless communication technologies have concurrently requested use of the selected first plurality of antennas or second plurality of antennas;
    selecting one wireless communication technology for use of the selected first plurality of antennas or second plurality of antennas; and
    coupling the selected first plurality of antennas or second plurality of antennas to a receiver associated with the selected wireless communication technology.

46. The non-transitory computer readable storage medium of clause 45, wherein the wireless communication technology is selected based at least in part on respective priorities associated with each wireless communication technology of the two or more wireless communication technologies.

47. The non-transitory computer readable storage medium of clause 45, wherein the wireless communication technology is selected based at least in part on respective duty cycles associated with each wireless communication technology of the two or more wireless communication technologies.

48. A device configured for supporting position locationing of a user equipment (UE) in a wireless network, including:
    means for receiving a request for determining a position of the UE;
    means for selecting one of a first plurality of antennas or a second plurality of antennas coupled to the UE;
    means for receiving wireless signals using the selected first plurality of antennas or the second plurality of antennas; and
    means for determining the position of the UE based at least in part on the received wireless signals.

49. The device of clause 48, wherein each antenna of the first plurality of antennas is located within a threshold distance of each other antenna of the first plurality of antennas, and wherein each antenna of the second plurality of antennas is located more than the threshold distance from each other antenna of the second plurality of antennas.

50. The device of clause 49, wherein the threshold distance corresponds to half a wavelength of the received wireless signals.

51. The device of clause 50, wherein the first plurality of antennas is selected, and wherein the position of the UE is determined based at least in part on an angle of arrival (AoA) of the received wireless signals.

52. The device of clause 48, wherein the means for selecting one of the first plurality of antennas or the second plurality of antennas is based on a wireless communication technology selected for determining the position of the UE.

53. The device of clause 52, wherein the wireless communication technology is selected from two or more wireless communication technologies.

54. The device of clause 53, wherein the means for selecting one of the first plurality of antennas or the second plurality of antennas includes means for coupling the selected first plurality of antennas or second plurality of antennas to a wireless receiver associated with the selected wireless communication technology.

55. The device of clause 53, wherein the two or more wireless communication technologies include one or more of an ultrawideband (UWB) wireless communication technology, a Wi-Fi wireless communication technology, and a 5G new radio (NR) wireless communication technology.

56. The device of clause 53, wherein selecting the wireless communication technology is based at least in part on a positioning accuracy associated with each of the two or more wireless communication technologies.

57. The device of clause 53, wherein selecting the wireless communication technology is based at least in part on a power consumption associated with determining the position of the UE using each of the two or more wireless communication technologies.

58. The device of clause 53, wherein selecting the wireless communication technology is based at least in part on a maximum range associated with each of the two or more wireless communication technologies.

59. The device of clause 48, wherein the received request includes a requested wireless communication technology for determining the position of the UE, and wherein the method further includes means for coupling the selected first plurality of antennas or second plurality of antennas to a receiver associated with the requested wireless communication technology.

60. The device of clause 48, further including:
    means for identifying a wireless communication technology associated with the received request;

means for determining that two or more wireless communication technologies have concurrently requested use of the selected first plurality of antennas or second plurality of antennas;
means for selecting one wireless communication technology for use of the selected first plurality of antennas or second plurality of antennas; and
means for coupling the selected first plurality of antennas or second plurality of antennas to a receiver associated with the selected wireless communication technology.

61. The device of clause 60, wherein the wireless communication technology is selected based at least in part on respective priorities associated with each wireless communication technology of the two or more wireless communication technologies.

62. The device of clause 60, wherein the wireless communication technology is selected based at least in part on respective duty cycles associated with each wireless communication technology of the two or more wireless communication technologies.

Therefore, it is intended that claimed subject matter not be limited to the particular examples disclosed, but that such claimed subject matter may also include all aspects falling within the scope of appended claims, and equivalents thereof.

What is claimed is:

1. A method for supporting position locationing of a user equipment (UE) in a wireless network comprising:
receiving a request for determining a position of the UE;
selecting one of a first plurality of antennas or a second plurality of antennas coupled to the UE;
receiving wireless signals using the selected first plurality of antennas or the second plurality of antennas; and
determining the position of the UE based at least in part on the received wireless signals.

2. The method of claim 1, wherein each antenna of the first plurality of antennas is located within a threshold distance of each other antenna of the first plurality of antennas, and wherein each antenna of the second plurality of antennas is located more than the threshold distance from each other antenna of the second plurality of antennas.

3. The method of claim 2, wherein the threshold distance corresponds to half a wavelength of the received wireless signals.

4. The method of claim 3, wherein the first plurality of antennas is selected, and wherein the position of the UE is determined based at least in part on an angle of arrival (AoA) of the received wireless signals.

5. The method of claim 1, wherein selecting one of the first plurality of antennas or the second plurality of antennas is based on a wireless communication technology selected for determining the position of the UE.

6. The method of claim 5, wherein the wireless communication technology is selected from two or more wireless communication technologies.

7. The method of claim 6, wherein selecting one of the first plurality of antennas or the second plurality of antennas comprises coupling the selected first plurality of antennas or second plurality of antennas to a wireless receiver associated with the selected wireless communication technology.

8. The method of claim 6, wherein the two or more wireless communication technologies comprise one or more of an ultrawideband (UWB) wireless communication technology, a Wi-Fi wireless communication technology, and a 5G new radio (NR) wireless communication technology.

9. The method of claim 6, wherein selecting the wireless communication technology is based at least in part on a positioning accuracy associated with each of the two or more wireless communication technologies.

10. The method of claim 6, wherein selecting the wireless communication technology is based at least in part on a power consumption associated with determining the position of the UE using each of the two or more wireless communication technologies.

11. The method of claim 6, wherein selecting the wireless communication technology is based at least in part on a maximum range associated with each of the two or more wireless communication technologies.

12. The method of claim 1, wherein the received request includes a requested wireless communication technology for determining the position of the UE, and wherein the method further includes coupling the selected first plurality of antennas or second plurality of antennas to a receiver associated with the requested wireless communication technology.

13. The method of claim 1, further comprising:
identifying a wireless communication technology associated with the received request;
determining that two or more wireless communication technologies have concurrently requested use of the selected first plurality of antennas or second plurality of antennas;
selecting one wireless communication technology for use of the selected first plurality of antennas or second plurality of antennas; and
coupling the selected first plurality of antennas or second plurality of antennas to a receiver associated with the selected wireless communication technology.

14. The method of claim 13, wherein the wireless communication technology is selected based at least in part on respective priorities associated with each wireless communication technology of the two or more wireless communication technologies.

15. The method of claim 13, wherein the wireless communication technology is selected based at least in part on respective duty cycles associated with each wireless communication technology of the two or more wireless communication technologies.

16. A device configured for supporting position locationing of a user equipment (UE) in a wireless network, comprising:
an antenna system including at least a first plurality of antennas and a second plurality of antennas;
at least one transceiver coupled to the antenna system;
at least one memory; and
at least one processor coupled to the at least one transceiver and the at least one memory, wherein the at least one processor is configured to cause the device to:
receive a request for determining a position of the UE;
select one of the first plurality of antennas or the second plurality of antennas for determining the position of the UE;
receive wireless signals using the selected first plurality of antennas or the second plurality of antennas; and
determine the position of the UE based at least in part on the received wireless signals.

17. The device of claim 16, wherein each antenna of the first plurality of antennas is located within a threshold distance of each other antenna of the first plurality of antennas, and wherein each antenna of the second plurality of antennas is located more than the threshold distance from each other antenna of the second plurality of antennas.

18. The device of claim 17, wherein the threshold distance corresponds to half a wavelength of the received wireless signals.

19. The method of claim 18, wherein the first plurality of antennas is selected, and wherein the position of the UE is determined based at least in part on an angle of arrival (AoA) of the received wireless signals.

20. The device of claim 16, wherein selecting one of the first plurality of antennas or the second plurality of antennas is based on a wireless communication technology for determining the position of the UE.

21. The device of claim 20, wherein the wireless communication technology is selected from two or more wireless communication technologies.

22. The device of claim 21, wherein selecting one of the first plurality of antennas or the second plurality of antennas comprises coupling the selected first plurality of antennas or second plurality of antennas to a wireless receiver associated with the selected wireless communication technology.

23. The device of claim 21, wherein the selected first plurality of antennas or second plurality of antennas is coupled to the wireless receiver associated with the selected wireless communication technology using one or more switches.

24. The device of claim 21, wherein the selected first plurality of antennas or second plurality of antennas is coupled to the wireless receiver associated with the selected wireless communication technology using an internal feedforward circuit.

25. The device of claim 21, wherein the two or more wireless communication technologies comprise one or more of an ultrawideband (UWB) wireless communication technology, a Wi-Fi wireless communication technology, and a 5G new radio (NR) wireless communication technology.

26. The device of claim 21, wherein selecting the wireless communication technology is based at least in part on a positioning accuracy associated with each of the two or more wireless communication technologies.

27. The device of claim 21, wherein selecting the wireless communication technology is based at least in part on a power consumption associated with determining the position of the UE using each of the two or more wireless communication technologies.

28. The device of claim 21, wherein selecting the wireless communication technology is based at least in part on a maximum range associated with each of the two or more wireless communication technologies.

29. The device of claim 16, wherein the received request includes a requested wireless communication technology for determining the position of the UE, and wherein the method further includes coupling the selected first plurality of antennas or second plurality of antennas to a receiver associated with the requested wireless communication technology.

30. The device of claim 16, wherein the at least one processor is further configured to cause the device to:
identify a wireless communication technology associated with the received request;
determine that two or more wireless communication technologies have concurrently requested use of the selected first plurality of antennas or second plurality of antennas;
select one wireless communication technology for use of the selected first plurality of antennas or second plurality of antennas; and
couple the selected first plurality of antennas or second plurality of antennas to a receiver associated with the selected wireless communication technology.

31. The method of claim 30, wherein the wireless communication technology is selected based at least in part on respective priorities associated with each wireless communication technology of the two or more wireless communication technologies.

32. The method of claim 30, wherein the wireless communication technology is selected based at least in part on respective duty cycles associated with each wireless communication technology of the two or more wireless communication technologies.

33. A non-transitory computer readable storage medium storing instructions for execution by one or more processors of a device configured for supporting position locationing of a user equipment (UE) in a wireless network, wherein execution of the instructions causes the device to perform operations comprising:
receiving a request for determining a position of the UE;
selecting one of a first plurality of antennas or a second plurality of antennas coupled to the UE;
receiving wireless signals using the selected first plurality of antennas or the second plurality of antennas; and
determining the position of the UE based at least in part on the received wireless signals.

34. The non-transitory computer readable storage medium of claim 33, wherein each antenna of the first plurality of antennas is located within a threshold distance of each other antenna of the first plurality of antennas, and wherein each antenna of the second plurality of antennas is located more than the threshold distance from each other antenna of the second plurality of antennas.

35. The non-transitory computer readable storage medium of claim 34, wherein the threshold distance corresponds to half a wavelength of the received wireless signals.

36. The non-transitory computer readable storage medium of claim 35, wherein the first plurality of antennas is selected, and wherein the position of the UE is determined based at least in part on an angle of arrival (AoA) of the received wireless signals.

37. The non-transitory computer readable storage medium of claim 33, wherein selecting one of the first plurality of antennas or the second plurality of antennas is based on a wireless communication technology selected for determining the position of the UE.

38. The non-transitory computer readable storage medium of claim 37, wherein the wireless communication technology is selected from two or more wireless communication technologies.

39. The non-transitory computer readable storage medium of claim 38, wherein selecting one of the first plurality of antennas or the second plurality of antennas comprises coupling the selected first plurality of antennas or second plurality of antennas to a wireless receiver associated with the selected wireless communication technology.

40. The non-transitory computer readable storage medium of claim 38, wherein the two or more wireless communication technologies comprise one or more of an ultrawideband (UWB) wireless communication technology, a Wi-Fi wireless communication technology, and a 5G new radio (NR) wireless communication technology.

41. The non-transitory computer readable storage medium of claim 38, wherein selecting the wireless communication technology is based at least in part on a positioning accuracy associated with each of the two or more wireless communication technologies.

42. The non-transitory computer readable storage medium of claim 38, wherein selecting the wireless communication technology is based at least in part on a power consumption associated with determining the position of the UE using each of the two or more wireless communication technologies.

43. The non-transitory computer readable storage medium of claim 38, wherein selecting the wireless communication technology is based at least in part on a maximum range associated with each of the two or more wireless communication technologies.

44. The non-transitory computer readable storage medium of claim 33, wherein the received request includes a requested wireless communication technology for determining the position of the UE, and wherein the method further includes coupling the selected first plurality of antennas or second plurality of antennas to a receiver associated with the requested wireless communication technology.

45. The non-transitory computer readable storage medium of claim 33, wherein execution of the instructions causes the device to perform operations further comprising:
   identifying a wireless communication technology associated with the received request;
   determining that two or more wireless communication technologies have concurrently requested use of the selected first plurality of antennas or second plurality of antennas;
   selecting one wireless communication technology for use of the selected first plurality of antennas or second plurality of antennas; and
   coupling the selected first plurality of antennas or second plurality of antennas to a receiver associated with the selected wireless communication technology.

46. The non-transitory computer readable storage medium of claim 45, wherein the wireless communication technology is selected based at least in part on respective priorities associated with each wireless communication technology of the two or more wireless communication technologies.

47. The non-transitory computer readable storage medium of claim 45, wherein the wireless communication technology is selected based at least in part on respective duty cycles associated with each wireless communication technology of the two or more wireless communication technologies.

* * * * *